(12) United States Patent
Bauch

(10) Patent No.: US 7,649,953 B2
(45) Date of Patent: Jan. 19, 2010

(54) DIFFERENTIAL MULTIPLE-LENGTH TRANSMIT AND RECEPTION DIVERSITY

(75) Inventor: Gerhard Bauch, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 614 days.

(21) Appl. No.: 10/545,588

(22) PCT Filed: Feb. 13, 2003

(86) PCT No.: PCT/EP03/01439

§ 371 (c)(1),
(2), (4) Date: May 12, 2006

(87) PCT Pub. No.: WO2004/073247

PCT Pub. Date: Aug. 26, 2004

(65) Prior Publication Data

US 2006/0274846 A1    Dec. 7, 2006

(51) Int. Cl.
*H04B 7/02* (2006.01)
(52) U.S. Cl. ........................ 375/267; 264/299; 264/298; 264/308; 264/324; 264/279
(58) Field of Classification Search ................. 375/267, 375/264, 299, 298, 308, 324, 329, 279
See application file for complete search history.

(56) References Cited

U.S. PATENT DOCUMENTS 4,534,040 A * 8/1985 Thapar ........................ 375/261
5,541,955 A * 7/1996 Jacobsmeyer ............... 375/222
7,200,128 B2 * 4/2007 Raith .......................... 370/336
7,218,689 B2 * 5/2007 Gupta .......................... 375/340
7,394,865 B2 * 7/2008 Borran et al. ................ 375/295

(Continued)

FOREIGN PATENT DOCUMENTS

WO    WO 02/052773 A1    7/2002

(Continued)

OTHER PUBLICATIONS

Bahceci, et al., "Combined Turbo Coding and Unitary Space-Time Modulation," IEEE Transactions on Communications, 50:1244-1249 (2002).

(Continued)

*Primary Examiner*—Shuwang Liu
*Assistant Examiner*—Rahel Guarino
(74) *Attorney, Agent, or Firm*—Nutter McClelnnen & Fish LLP; John J. Penny, Jr.

(57) ABSTRACT

The present invention achieves differential transmit diversity and related diversity reception schemes transmit symbol constellations which are extended to multiple levels. Heretofore, a group of transmission bits is divided into a first sub-group of transmission bits and a second sub-group of transmission bits. Then, the first sub-group of transmission bits is mapped (14) onto constellation points of a differential transmit diversity coding scheme from an orthogonal design for coding of the first sub-group of transmission bits. Then, after differential encoding of the constellation points (32, 34, 36, 40) a length of the transmission symbol vector is scaled (38) for coding the second sub-group of transmission bits. Therefore, the present invention overcomes restrictions implied through unit length requirements for previously known differential transmit diversity schemes from orthogonal designs.

22 Claims, 9 Drawing Sheets

U.S. PATENT DOCUMENTS

2002/0051501 A1* 5/2002 Demjanenko et al. ....... 375/298

FOREIGN PATENT DOCUMENTS

| WO | WO 02/061952 A1 | 8/2002 |
| WO | WO 2004/073247 A1 | 8/2004 |

OTHER PUBLICATIONS

Hughes, "Differential Space-Time Modulation," IEEE Transactions on Information Theory, 46:2567-2578 (2000).

Tonello, "Performance of Space-Time Bit-Interleaved Codes in Fading Channels with Simplified Iterative Decoding," IEEE, pp. 1357-1361 (2001).

Hochwald, et al., "Differential Unitary Space-Time Modulation," IEEE Transactions on Communications, 48:2041-2052 (2000).

Xia, "Differentially En/Decoded Orthogonal Space-Time Block Codes With APSK Signals," IEEE Communications Letters, 6:150-152 (2002).

Telatar, "Capacity of Multi-Antenna Gaussian Channels," Communication Theory, 10:585-595 (1999).

Jafarkhani, et al., "Multiple Transmit Antenna Differential Detection From Generalized Orthogonal Designs," IEEE Transactions on Information Theory, 47:2626-2631 (2001).

Foschini, et al., "On Limits of Wireless Communications in a Fading Environment when Using Multiple Antennas," Wireless Personal Communications 6:311-335 (1998).

Tarokh, et al., "A Differential Detection Scheme for Transmit Delivery," IEEE Journal on Selected Areas in Communications, 18:1169-1174 (2000).

International Preliminary Examination Report dated Feb. 13, 2003.

Hagenauer, "Rate-Compatible Punctured Convolutional Codes (RCPC Codes) and Their Applications," IEEE Transactions on Communications, 36:389-400 (1988).

Rohling, et al., "Differential Amplitude Phase Shift Keying (DAPSK)—A New Modulation Method for DTVB," International Broadcasting Convention, pp. 102-108 (1995).

Steiner, et al., "Iterative Decoding of Space-Time Differentially Coded Unitary Matrix Modulation," IEEE Transactions on Signal Processing, 50:2385-2395 (2002).

Tarokh, et al., "Space-Time Block Coding for Wireless Communications: Performance Results," IEEE Journal on Selected Areas in Communications, vol. 17, No. 3, pp. 451-460 (2000).

International Search Report dated Oct. 10, 2003.

International Preliminary Examination Report dated May 12, 2005.

* cited by examiner

DIFFERENTIAL MULTIPLE-LENGTH TRANSMIT AND RECEPTION DIVERSITY

FIELD OF INVENTION

The present invention relates to differential transmit diversity and related diversity reception, and in particular to differential transmit diversity and related diversity reception using transmission symbol vectors having multiple length values.

BACKGROUND ART

For wireless communication transmit diversity techniques are a known technology to mitigate the detrimental effects of fading. One class of transmit diversity technique use so-called space-time codes. Space-time codes typically require knowledge of channel coefficients at the receiver side which knowledge may be obtained from transmission channel estimation.

However, transmission channel estimation is a significant problem in multiple input multiple output MIMO wireless communication systems as a plurality of subchannels has to be estimated and the energy of pilot symbols has to be distributed over a plurality of transmit antennas.

In view of the above, differential transmit diversity schemes being based on unitary space-time modulation schemes have been proposed in B. Hochwald and W. Swelden: *Differential Unitary Space-Time Modulation. IEEE Transactions on Communications*, 48(12): 2041-2052, December 2000 and B. L. Hughes: *Differential Space-Time Modulation. IEEE Transactions on Information Theory*, 46(7):2567-2578, November 2000, where transmission symbols are used for set up of unitary transmission symbol matrices.

As another alternative, differential transmit diversity techniques requiring no channel estimation and being based on so-called orthogonal designs have been proposed for two transmit antennas in V. Tarokh and H. Jafarkhani: *A Differential Detection Scheme for Transmit Diversity. IEEE Journal on Selected Areas in Communications*, 18(7):1169-1174, July 2000, and further been generalized to more than two transmit antennas in H. Jafarkhani and V. Tarokh: *Multiple Transmit Antenna Differential Detection from Generalized Orthogonal Designs. IEEE Transactions on Information Theory*, 47(6):2626-2631, September 2001.

A disadvantage of differential space-time block codes from orthogonal designs is the limitation to unit length transmission symbol vectors. Here, distance properties being relevant for the achievable error rate are determined by distances between constellation elements of a phase shift keying PSK modulation scheme forming the basis for the setup of differential space-time block codes. It should be noted that distance properties of a M-ary phase shift keying PSK modulation scheme are only advantageous for $M \leq 8$.

In other words, for higher order modulation it would be preferable to code information, both, in phase and amplitude, e.g., through use of quadrature amplitude modulation QAM schemes. For differential modulation with respect to single transmit antenna systems there exist proposals for modulation schemes using multiple amplitude levels, e.g., in H. Rohling and V. Engels: *Differential Amplitude Phase Shift Keying (DAPSK)—a New Modulation Method for DTCB. In International Broadcasting Convention*, Pages 102-108, 1995, and F. Adachi and M. Sawahashi: *Decision Feedback Differential Detection of Differentially Encoded 16 APSK signals. IEEE Transactions on Communications*, 44, April 1996, pages 416-418. According to these proposals a signal space constellation is constructed from concentric phase shift keying PSK constellations. This is the reason for calling the method differential amplitude/phase shift keying DAPSK.

Further, there exits a proposal considering differential transmit diversity with multiple amplitude levels, see X.-G. Xia: *Differentially En/decoded Orthogonal Space-Time Block Codes with APSK Signals. IEEE Communications Letters*, 6(4):150-152, April 2002. It is proposed to select transmission symbols for input to the differential space-time modulator from an amplitude/phase shift keying APSK constellation, in particular a concentric phase shift keying PSK constellation having multiple phases and multiple levels of amplitudes. Therefore, this proposal only uses differential amplitude/phase shift keying DAPSK signals as proposed in H. Rohling and V. Engels: *Differential Amplitude Phase Shift Keying DAPSK—a New Modulation Method for DTCB. In International Broadcasting Convention*, Pages 102-108, 1995 as input for a unitary space-time modulator according to B. Hochwald and W. Swelden: *Differential Unitary Space-Time Modulation. IEEE Transactions on Communications*, 48(12): 2041-2052, December 2000.

SUMMARY OF INVENTION

In view of the above, the object of the present invention is provide differential transmit diversity and related diversity reception schemes having transmit symbol constellations extended to multiple levels.

According to a first aspect of the present invention, this object is achieved through a method of achieving differential multiple-length transmit diversity using at least two transmit antennas. In a first step a group of transmission bits is divided into a first sub-group of transmission bits and a second sub-group of transmission bits. In a second step the first sub-group of transmission bits is mapped onto constellation points of a differential transmit diversity coding scheme from an orthogonal design for coding the first sub-group of transmission bits. Subsequent hereto, in a third step transmission symbols are determined through differential encoding of the constellation points and previously transmitted transmission symbols for setup of a transmission symbol vector. Finally, in a fourth step a length of the transmission symbol vector is scaled for coding the second sub-group of transmission bits.

Therefore, the present invention overcomes restrictions implied through unit length requirements for previously known differential transmit diversity schemes from orthogonal designs. In particular, the differential multiple-length transmit diversity improves distance properties of the modulation scheme which are relevant for achievable error rates and extends higher order modulation also to the area of differential transmit diversity schemes from orthogonal designs.

Another advantage of the present invention is that differential multiple-length transmit diversity allows for a much more flexible range of data rates. In particular, using two sub-groups of transmission bits the number of information bits may freely selected before assignment to orthogonal designs and subsequent transmission thereof.

Yet another advantage of this preferred embodiment is lower detection complexity as after transmission the number of comparisons with possible transmission symbols at the receiver side is significantly reduced compared to unit length differential transmit diversity schemes. In more detail, while a unit length differential transmit diversity scheme of a M-ary phase shift keying PSK constellation requires $M^2$ comparisons, a differential multiple length transmit diversity scheme using a $M_1$-ary phase shift keying PSK constellation and $\log_2(M_2)$ transmission bits for the second sub-group of transmission bits requires only $M_1^2+2(M_2-1)+1$ comparisons. E.g., assuming values of M=8, $M_1$=6, $M_2$=4, the number of comparisons would be reduced from 64 to 23.

According to a preferred embodiment of the present invention the second sub-group of transmission bits is coded into a length difference of two successive transmission symbol vectors.

An important advantage of this preferred embodiment is that coding into a length difference supports diversity reception without mandatory application of channel estimation techniques and therefore simple detection. This applies, both, to the first sub-group of transmission bits and to the second sub-group of transmission bits.

According to yet another preferred embodiment of the present invention the first sub-group of transmission bits and the second sub-group of transmission bits are selected to achieve selective error protection.

Here, the present invention can support different bit error probabilities for transmission bits coded through the differential transmit diversity coding scheme and the transmission bits coded through scaling the length of the transmission symbol vector. This is of particular benefit for applications with unequal error protection, i.e. applications where different bits have different significance.

According to yet another preferred embodiment of the present invention the step of scaling the transmission symbol vector length is achieved in a cyclic manner as function of the length of a previously transmitted transmission symbol vector and the second sub-group of transmission bits.

Cyclic scaling is particularity suitable for coding the second sub-group of transmission bits into a length difference of the transmission symbol vector. Further, cyclic scaling allows for a very efficient implementation of the scaling step with minimized computational complexity and memory requirements.

According to a second aspect of the present invention, the object of the present invention is achieved through a method of differential multiple-length diversity reception of transmission symbols using at least one reception antenna, wherein transmission symbols carry information being coded through mapping of a first sub-group of transmission bits onto constellation points of a differential transmit diversity scheme from an orthogonal design for coding the first sub-group of transmission bits, subsequent differential coding of the constellation points and previously transmitted transmission symbols for setup of a transmission symbol vector, and scaling of a length of the transmission symbol vector for coding a second sub-group of transmission bits.

In a first step received transmission symbols are organized into a plurality of reception vectors according to a pre-determined scheme. In a second step the reception vectors are combined for determination of at least a first decision variable and a second decision variable in relation to the first sub-group of transmission bits and further for determination of a third decision variable in relation to the second sub-group of transmission bits. In a third step a first detection output is determined in relation to the first sub-group of transmission bits on the basis of the first decision variable and the second decision variable, respectively. In a fourth, final step a second detection output is determined in relation to the second sub-group of transmission bits on the basis of the third decision variable.

A first advantage of the differential multiple-length diversity reception method according to the present invention is that it may be operated in non-coherent manner. The reason for this is the coding of the first subgroup of transmission bits using the differential transmit diversity scheme from an orthogonal design which allows for determination of decision variables through a simple combination step.

A second advantage of the differential multiple-length diversity reception method according to the present invention is that it allows to consider that for multiple-length transmit diversity from orthogonal designs the noise variance of noise superimposed on the first sub-group of transmission bits differs from the noise variance superimposed on the second sub-group of transmission bits. In particular, the present invention enables appropriate calculation of decision variables in relation to the first subgroup of transmission bits and the second sub-group of transmission bits for treatment of noise superimposed on bits in different sub-groups of transmission bits.

According to a preferred embodiment of the present invention, the different decision variables are calculated from a linear system representation of the multiple input multiple output channel and the build up reception vectors.

The advantage of this preferred embodiment of the present invention is the use of a very low number of received orthogonal designs for decision variable calculation, e.g., a number of two. Therefore, output detection is achieved with low complexity and low delay. Further, time varying multiple input multiple output transmission channels have practically no impact on the output detection performance.

Further preferred embodiments of the present invention are related to output detection for the first sub-group of transmission bits and for the second sub-group of transmission bits. Here, the present invention supports either hard output detection or soft output detection, both, for the first sub-group of transmission bits and for the second sub-group of transmission bits, respectively. Further, the present invention also supports any hybrid form of hard output detection and soft output detection for different sub-groups of transmission bits.

An advantage of hard output detection is that it may be implemented with very low computational complexity. On the other hand, in wireless communication systems differential transmit diversity schemes are concatenated with outer forward error correction FEC codes, which concatenation is particularity supported through soft output detection mechanisms.

Further, any hybrid form of soft and hard output detection is particularity suitable for selective error rates and related applications where transmission bits for which a lower error rate is requested are handled through soft output detection and remaining transmission are handled through hard output detection.

According to another preferred embodiment of the present invention soft output detection relies on determination of log-likelihood ratios—either for the first sub-group of transmission bits or for the second sub-group of transmission bits. Preferably, log-likelihood ratios are calculated from max-log approximations.

As outlined above, the delivery of soft output bit decisions using log likelihood ratios significantly improves the performance of successive detection stages, e.g., an error correction decoder, compared to hard output detectors as known in the art for space-time block codes. The availability of log likelihood ratios for soft output detection is based on certain properties of the differential transmit diversity scheme, i.e. related constellation points of the differential transmit diversity scheme onto which a set of input bits from the first sub-group of transmission bits are mapped at the transmitter side have unit length.

According to yet another preferred embodiment of the present invention there is provided a step of estimating a value of a resulting channel coefficient and variances of noise superimposed during transmission using single input single output estimation techniques.

Further to the above, where non-coherent reception diversity has been emphasized, this preferred embodiment of the present invention allows to generate additional information in particular during the soft output decision process which may be of particular value for subsequent processing stages, e.g., channel decoding, equalization, or turbo feedback. As single input single output channel estimation has a significantly lower complexity than multiple input multiple output channel estimation it requires less training symbols and may also be performed using standard estimation techniques.

According to another preferred embodiment of the present invention there is provided a computer program product directly loadable into the internal memory of a differential multiple length diversity transmitter comprising software code portions for performing the steps of the method of achieving differential multiple-length transmit diversity according to the present invention when the product is run on a processor of the differential multiple length diversity transmitter.

According to yet another preferred embodiment of the present invention there is provided a computer program product directly loadable into the internal memory of a differential multiple length diversity receiver comprising software code portions for performing the steps of the method of non-coherent differential multiple-length diversity reception according to the present invention when the product is run on a processor of the differential multiple length diversity receiver.

Therefore, the present invention is also provided to achieve an implementation of the inventive method steps on computer or processor systems. In conclusion, such implementation leads to the provision of computer programs stored in a computer readable storage medium for performing the inventive method steps with a computer system or more specifically a processor comprised, e.g., in a differential multiple length diversity transmitter or a differential multiple length diversity receiver.

The programs defining the function of the present invention can be delivered to a computer/processor in many forms, including, but not limited to information permanently stored on non-writeable storage media, e.g., read only memory devices such as ROM or CD ROM discs readable by processors or computer I/O attachments; information stored on writable storage media, i.e. floppy discs and hard drives; or information convey to a computer/processor through communication media such as local area network and/or telephone networks and/or Internet or other interface devices. It should be understood, that such media when carrying processor readable instructions implementing the inventive concept represent alternate embodiments of the present invention.

DESCRIPTION OF DRAWING

In the following the best mode and preferred embodiments of the present invention will be explained with reference to the drawing in which.

DESCRIPTION OF BEST MODE AND PREFERRED EMBODIMENTS

Figure 1:
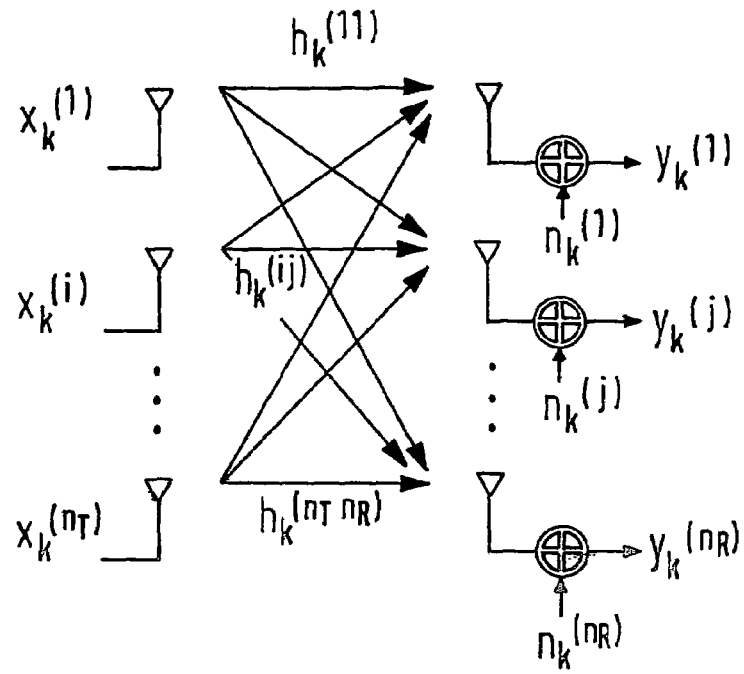
FIG. 1 shows a schematic diagram of a flat fading multiple input multiple output channel model as basis for differential multiple-length transmit diversity and related diversity reception according to the present invention.

In the following, the best mode and preferred embodiments of the present invention will be explained with reference to the drawing. Initially, some basic concepts underlying differential multiple-length transmit diversity and related diversity reception will be explained for a better understanding of the present invention.

Channel Model

FIG. 1 shows a schematic diagram of a flat fading multiple input multiple output channel model as basis for differential multiple-length transmit diversity and related diversity reception according to the present invention.

As shown in FIG. 1, a flat fading multiple-input-multiple-output (MIMO) channel describes a system with $n_T$ transmit antennas and $n_R$ receive antennas. The channel gain from transmit antenna i to receive antenna j at time k is denoted by $h_k^{(ij)}$. Further, the symbol transmitted from antenna i at time k is denoted by $x_k^{(i)}$. The observed value at receive antenna j at time k is given by $$y_k^{(j)} = \sum_{i=1}^{n_T} h_k^{(ij)} x_k^{(i)} + n_k^{(j)},$$

where $n_k^{(j)}$ is the additive noise at receive antenna j.

It should be noted, that FIG. 1 shows a frequency flat multiple input multiple output channel for the explanation of differential multiple-length transmit diversity and related diversity reception schemes in the following. However, the different embodiments of the present invention are also applicable to frequency-selective multiple input multiple output channels which are decomposed into a set of flat fading channels using appropriate techniques, e.g., using orthogonal frequency division multiple access and a guard interval.

Principle of Differential Space-Time Block Codes from Orthogonal Designs

Further to the explanation of the channel model given above, in the following principles of differential space-time block codes from orthogonal designs will be explained.

The basis for differential space-time block codes from orthogonal designs are non-differential transmit diversity techniques using orthogonal designs, e.g., as proposed for two transmit antennas in S. Alamouti: *A Simple Transmitter Diversity Technique for Wireless Communications. IEEE Journal on Selected Areas of Communications, Special Issue on Signal Processing for Wireless Communications*, 16(8): 1451-1458, 1998, incorporated herein by reference, and further generalized to more than two transmit antennas in V. Tarokh, H. Jafarkhani, and A. R. Calderbank: *Space-Time Block Codes From Orthogonal Designs. IEEE Transactions on Information Theory*, 45(5):1456-1467, June 1999, also incorporated herein by reference.

Irrespective of the type of transmit diversity, during data transmission a source of information will generate a sequence of input bits to a modulator which will map different input bits onto different constellation points of a pre-determined modulation scheme, e.g., a 8-phase shift keying modulation scheme. For non-differential type transmit diversity, the generated constellation points will form the basis for set up of a so-called orthogonal design that may be represented by a matrix according to $$B = \begin{bmatrix} b_{11} & \cdots & b_{1n_T} \\ \vdots & & \vdots \\ b_{P1} & \cdots & b_{Pn_T} \end{bmatrix}$$

Here, the number of columns $n_T$ in the orthogonal design corresponds to the number of transmit antennas and the number of rows P corresponds to the number of time slots used for transmission. As already outlined above, the elements of the orthogonal design are elements of a modulation constellation scheme, complex conjugates of these elements and linear combinations thereof.

Space-time block coding therefore means to setup entries of the orthogonal design from a pre-determined number of constellation points of the modulation constellation scheme. All entries in the same row of the orthogonal design are transmitted simultaneously from a corresponding number of transmit antennas. Further, entries in the same column of the orthogonal design are transmitted from the same transmit antenna in successive time slots. Therefore, columns of the orthogonal design represent time while rows of the orthogonal design represent space. Due to the orthogonality of the orthogonal design, at the receiver side a simple linear combination allows for reception diversity.

In view of the above, differential transmit diversity techniques based on orthogonal designs have been proposed for two transmit antennas in V. Tarokh and H. Jafarkhani: *A differential Detection Scheme for Transmit Diversity. IEEE Journal on Selected Areas in Communications*, 18(7):1169-1174, July 2000, incorporated herein by reference, and further been generalized to more than two transmit antennas in H. Jafarkhani and V. Tarokh: *Multiple Transmit Antenna Differential Detection from Orthogonal Designs. IEEE Transactions on Information Theory*, 47(6):2626-2631, September 2001, also incorporated herein by reference.

Figure 2:
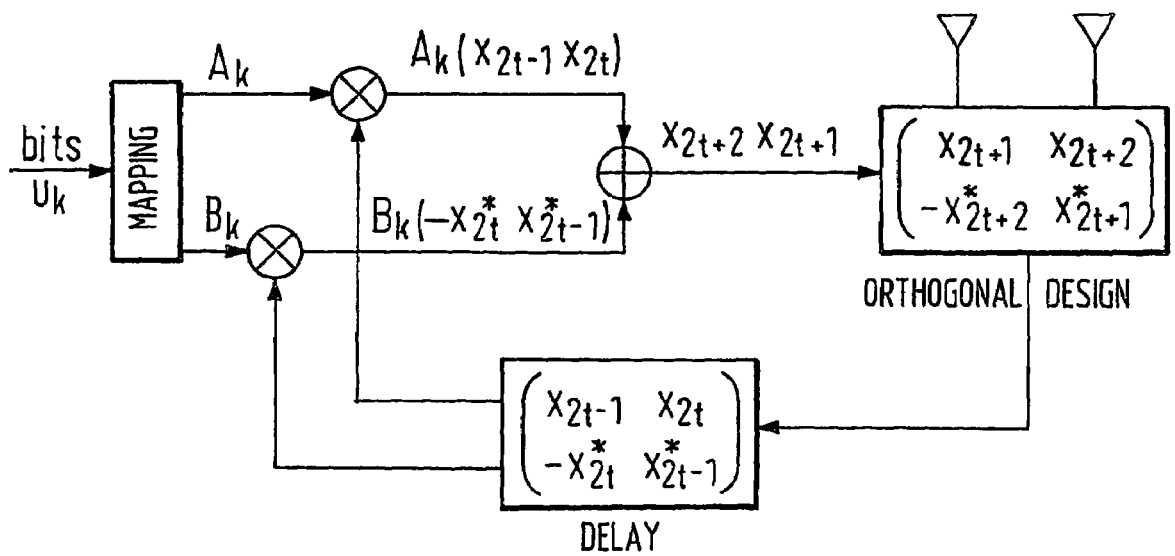
FIG. 2 shows a schematic diagram of an encoder for a differential transmit diversity scheme from orthogonal designs using a differential space-time block code for $n_T=2$ transmit antennas according to the present invention.

FIG. 2 shows a schematic diagram of an encoder for a differential transmit diversity scheme from orthogonal designs using a differential space-time block code for $n_T=2$ transmit antennas.

As shown in FIG. 2, differential transmit diversity relies on a mapping of bits $u_k=(u_{k,1}, \ldots, u_{k,2 \cdot log_2(M)})$ which are transmitted within the same orthogonal design—also referred to as code matrix or simply matrix in the following—to complex constellation points $A_k$ and $B_k$. The vector $(x_{2t+2}\ x_{2t+1})$ which is transmitted in a time slot has unit length according to $$|x_{2t+2}|^2 + |x_{2t+1}|^2 = 1. \tag{1}$$

It should be noted, that this requirement is introduced for reasons of differential detection at the receiver side. The mapping of bits onto constellation points may be achieved starting from an M-ary phase shift keying PSK constellation with constellation points $$d_k = \frac{1}{\sqrt{2}} e^{j2\pi n/M + \varphi_0}, \quad n = 0, 1, \ldots, M-1 \tag{2}$$

and through application of $$A_k = d_{2t+1}d(0)^* + d_{2t+2}d(0)^*$$

$$B_k = -d_{2t+1}d(0) + d_{2t+2}d(0). \tag{3}$$

The reference symbol d(0) may be chosen randomly from the M-ary PSK constellation. As $log_2(M)$ bits are mapped on each of the PSK constellation points $d_{2t+1}$ and $d_{2t+2}$ according to an arbitrary mapping, e.g., a Gray mapping, the constellation points $A_k$ and $B_k$ are determined by $2 \cdot log_2(M)$ bits. An important property of the mapping is that the vector $[A_k, B_k]$ has unit length:

$$|A_k|^2 + |B_k|^2 = 1. \tag{4}$$

For differential transmit diversity a reference space-time block code matrix or equivalently a reference orthogonal design is transmitted first, e.g., according to $$B = \begin{bmatrix} x_1 & x_2 \\ -x_2^* & x_1^* \end{bmatrix} \tag{5}$$

for an orthogonal design provided for two transmit antennas and a transmission over two time slots. The reference orthogonal design contains arbitrary symbols $x_1$ and $x_2$ taken from the M-ary PSK constellation, so that for the coding of the first bits a reference to a previous matrix, i.e. the reference code matrix is possible.

The following symbols for the space-time block code mapper which carry information are obtained from $$(x_{2t+1}, x_{2t+2}) = A_k(x_{2t-1}, x_{2t}) + B_k(-x_{2t}^*, x_{2t-1}^*). \tag{6}$$

In view of the above, orthogonal designs are transmitted over the multiple input multiple output channel which allows to separate the transmission symbols transmitted simultaneously from different antennas by simple combining at the receiver side.

Differential Multiple Length Transmit Diversity

The differential multiple length transmit diversity according to the present invention uses differential unit-length transmit diversity, as described in V. Tarok and H. Jafarkhani: *A* differential detection scheme for transmit diversity. IEEE Journal on Selected Areas in Communications, 18(7):1169-1174, July 2000 as starting point. However, contrary to the unit-length transmit diversity scheme where a unit length condition must be fulfilled for the transmission symbol vector $(x_{2t+1} x_{2t+2})$, according to the present invention it is proposed to extend the transmit symbol constellation—or in other words the constellation of possible transmit symbols—such that multiple levels are allowed for the lengths of transmit symbol vectors.

Figure 3:
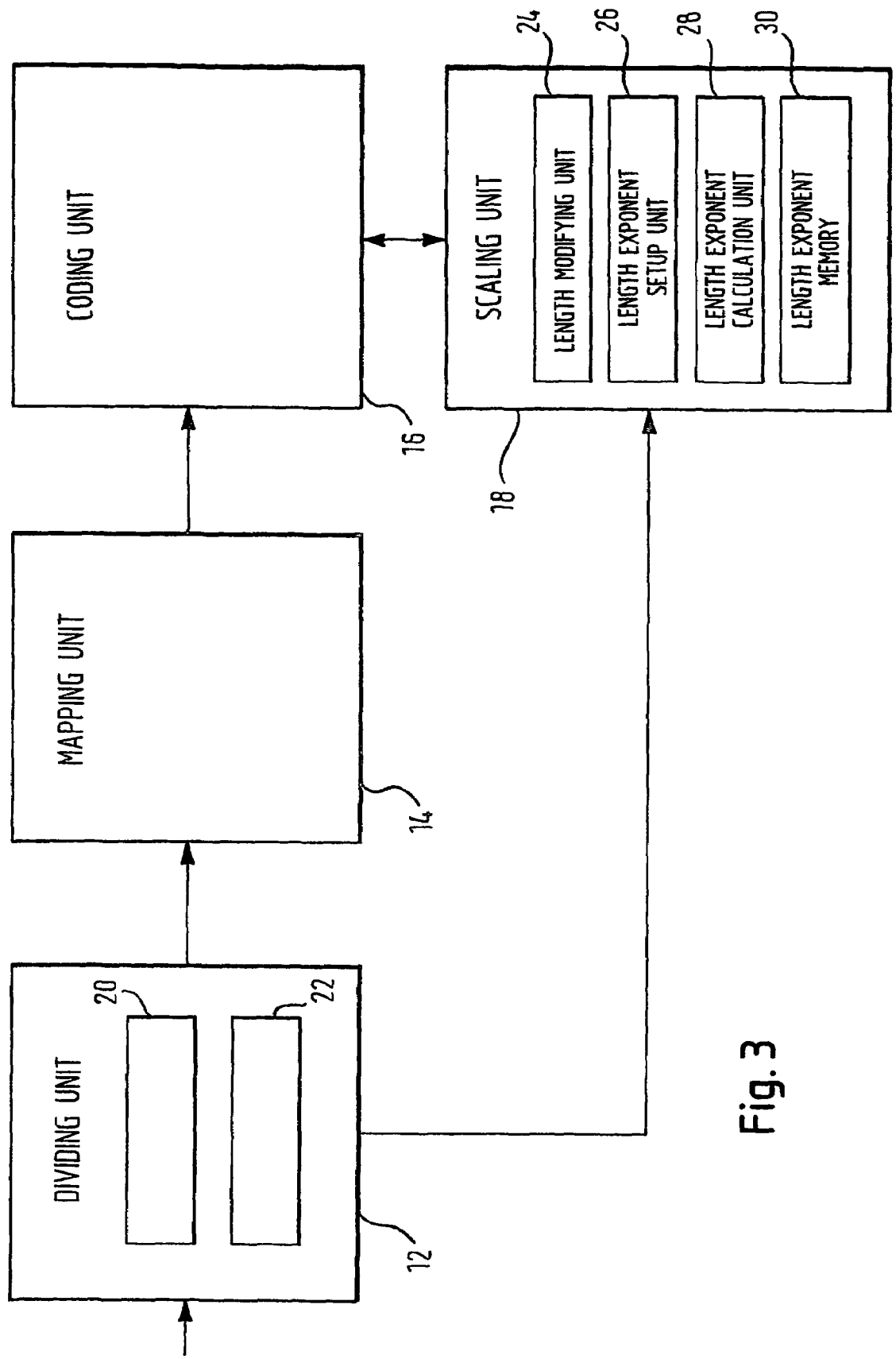
FIG. 3 shows a schematic diagram of a transmitter for achieving differential multiple-length transmit diversity according to the present invention.

FIG. 3 shows a schematic diagram of the transmitter 10 for achieving differential multiple-length transmit diversity according to the present invention.

As shown in FIG. 3, the transmitter comprises a dividing unit 12, a mapping unit 14, a coding unit 16, and a scaling unit 18. The dividing unit 12 is connected to the mapping unit 14 and is further connected to the scaling unit 18. Further, the mapping unit 14 is connect to the coding unit 16 and the coding unit 16 is connected to the scaling unit 18.

Figure 4:
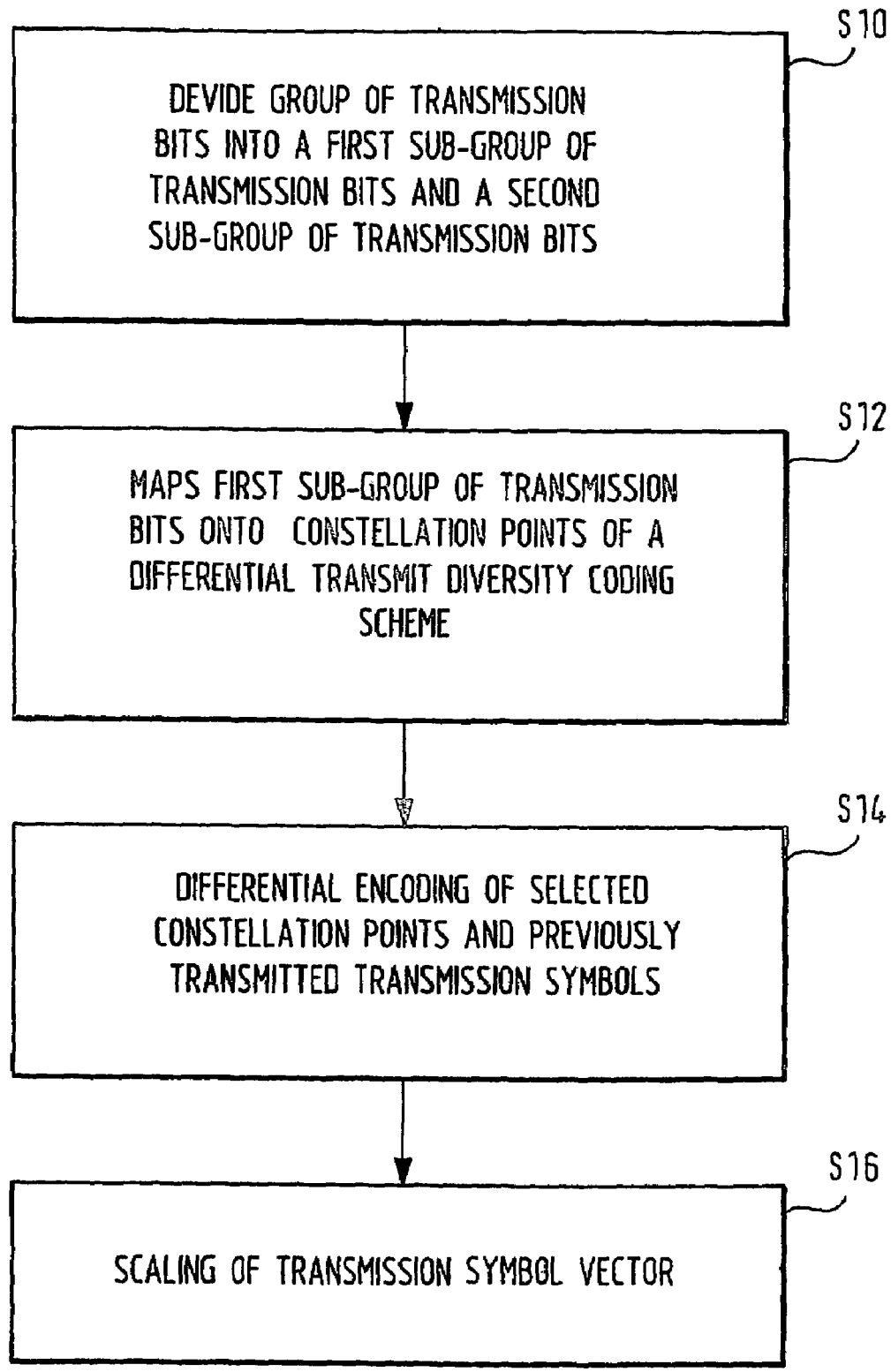
FIG. 4 shows a flowchart of operation for the transmitter shown in FIG. 3.

FIG. 4 shows a flowchart of operation for the transmitter shown in FIG. 3.

As shown in FIG. 4, for each sub-group of transmission bits the dividing unit 12 carries out a step S10 to achieve a division into a first sub-group of transmission bits for forwarding to the mapping unit 14 and into a second sub-group of transmission bits for forwarding to the scaling unit 18. In a following step S12 the mapping unit 14 will process the first sub-group of transmission bits through mapping them onto constellation points of a differential transmit diversity coding scheme from an orthogonal design for coding the first subgroup of transmission bits. In a subsequent step S14 the coding unit 16 operatively receives the mapping result from the mapping unit 14 for determination of transmission symbols through differential encoding of the constellation points and previously transmitted transmission symbols for setup of a transmission symbol vector. Finally the scaling unit 18 scales a length of the transmission symbol vector for coding the second sub-group of transmission bits in a step S16. On the basis of the transmission symbol vector also a remaining row or remaining rows of the orthogonal design will be set up.

In the following further details of differential multiple-length transmit diversity will be explained with reference to FIG. 3.

As shown in FIG. 3, the dividing unit 12 comprises a first selecting unit 20 and a second selecting unit 22.

Operatively, the dividing unit 12 shown in FIG. 3 will receive a group of $2\cdot\log_2(M_1)+\log_2(M_2)$ bits, wherein $M_1^2$ is the number of possible bit sequences of the first subgroup of transmission bits and $M_2$ is the number of possible length values of the transmission symbol vector. The first selecting unit 20 selects a number of $2\cdot\log_2(M_1)$ bits in the group of transmission bits for the first sub-group of transmission bits. Further the second selecting unit 22 selects a number of $\log_2(M_2)$ bits in the group of transmission bits for the second sub-group of transmission bits.

According to a preferred embodiment of the present invention the first selecting unit 20 and the second selecting unit 22 are adapted to achieve selective error protection to support different bit error probabilities for transmission bits. This is achieved through selecting the transmission bits requiring a lower error rate for the first sub-group of transmission bits and through selecting the remaining transmission bits for the second sub-group of transmission bits.

As shown in FIG. 3, the mapping unit 14 receives the first sub-group of transmission bits from the dividing unit 12 and operatively maps the first subgroup of $2\cdot\log_2(M_1)$ transmission bits onto a constellation vector $[A_k\ B_k]$ of the differential transmit diversity coding scheme according to:

$$A_k = d_{2t+1}d(0)^* + d_{2t+2}d(0)^*$$

$$B_k = -d_{2t+1}d(0) + d_{2t+2}d(0) \tag{7}$$

wherein $d_i$ are constellation elements of a $M_1$-ary phase shift keying PSK modulation scheme supported by the mapping unit; and $d(0)$ is a freely selectable reference point of the $M_1$-ary phase shift keying PSK modulation scheme.

As also shown in FIG. 3, the constellation vector $[A_k\ B_k]$ generated in the mapping unit 14 is forwarded to the coding unit 16 which operatively achieves differential encoding is achieved according to:

$$(s_{2t+1} s_{2t+2}) = A_k(x_{2t-1} x_{2t}) + B_k(-x_{2t}^* x_{2t-1}^*) \tag{8}$$

wherein t is an index in time; and $(x_{2t-1}\ x_{2t})$ is a transmission symbol vector according to a previously transmitted matrix.

In the following, the operation of the scaling unit 18 will be explained with reference to FIG. 3. In particular, it will be shown that according to the present invention the second sub-group of transmission bits is coded into a length difference of two successive transmission symbol vectors.

As shown in FIG. 3, the scaling unit comprises a length modification unit 24, a length exponent setup unit 26, a length exponent calculation unit 28, and—optionally—a length exponent memory 30.

Operatively, the length modification unit 24 is adapted to achieve scaling of the transmission symbol vector length in a cyclic manner as function of the length of a previously transmitted transmission symbol vector and the second group of transmission bits. In more detail, the scaling transmission symbol vector length is achieved according to:

$$(x_{2t+1} x_{2t+2}) = \sqrt{a^{q_k}} \cdot (s_{2t+1} s_{2t+2}) \tag{9}$$

wherein a is a constant; and $q_k \in \{-M_2+1, -M_2+2, \ldots, 0, 1, \ldots, M_2-1\}$ is a length exponent.

Therefore, according to the present invention the squared length of the transmit symbol vector has $M_2$ possible values $$|x_{2t+1}|^2 + |x_{2t+2}|^2 \in \{1, a, a^2, \ldots, a^{M_2-1}\}. \tag{10}$$

Therefore, depending on the $\log_2(M_2)$ bits in the second sub-group of transmission bits the transmit vector length is cyclically increased/decreased by a factor of $\pm 1, a, a^2, \ldots,$ or $a^{M_2-1}$. Table 1 gives an example for Gray mapping of input bits to the length exponent $q_k$ for $M_2=4$.

TABLE 1

Length exponent $q_k$ for differential multiple-length space-time block code, $M_2 = 4$.

| $Q_{k-1} =$ $\|x_{2t-1}\|^2 + \|x_{2t}\|^2$ | $u_{k-2,1}, u_{k-2,2}$ | | | |
|---|---|---|---|---|
| | 00 ($\delta_k = 0$) | 01 ($\delta_k = 1$) | 10 ($\delta_k = 2$) | 11 ($\delta_k = 3$) |
| 1 | 0 | 1 | 2 | 3 |
| a | 0 | 1 | 2 | -1 |
| $a^2$ | 0 | 1 | -2 | -1 |
| $a^3$ | 0 | -3 | -2 | -1 |

As outlined above and shown in Table 1, the value of the length exponent $q_k$ depends on the second sub-group of transmission bits $[u_{k,2,1}, \ldots, u_{k,2,log_2(M_2)}]$ and the absolute length $Q_{k-1}$ of the previously transmitted transmission symbol vector. As can also be seen, a factor characterizing the increase of the transmission symbol vector—also referred to as $\delta_k$ in the following—depends on the bit values in the second group of transmission bits.

For the example shown in Table 1, the relation established between bit patterns representing bit permutations for the second sub-group of transmission bits and the values of $\delta_k$ is: 00→0, 01→1, 10→2, and 11→3. Here, it should be noted that this relation may be freely modified as long as the relation between the bit permutations for the second sub-group of transmission bits and the values of $\delta_k$ is unique.

Further, as soon as a further increase in length of a transmission symbol vector would result in a length exceeding the upper limit of $\alpha^{M_2-1}$—e.g., starting from a transmission symbol vector of length $\alpha^3$ in view of a bit pattern 11 for the second group of transmission bits—the length modifying unit 24 will achieve a reduction in transmission symbol vector length.

As shown in FIG. 3, the length exponent setup unit 26 shown in FIG. 3 operatively calculates a set of $M_2$ scaling factors $\delta_k \in \{0, \ldots, M_2-1\}$ from a set of bit patterns $[p_1, \ldots, p_{log_2(M_2)}]$ covering permutations of the second group of transmission bits for all $p_i \in \{0,1\}$ according to:

$$\delta_k = \sum_{i=1}^{i=log_2(M_2)} [p_i \cdot 2^i]. \quad (11)$$

Further, operatively the length exponent setup unit 26 establishes a predetermined relation between bit patterns of the second group of transmission bits $[u_{k,2,1}, \ldots, u_{k,2,log_2(M_2)}]$ and the set of scaling factors, wherein $u_{k,2,i}$ is the i-th bit in the second group of transmission bits.

It should be noted that the length exponent setup unit 26 is activated only once before start of differential multiple-transmit diversity transmission in preparing the coding for the second sub-group of transmission bits. The results generated by the length exponent setup unit 26 may be stored in the length exponent memory 30 for subsequent use during coding the second subgroup of transmission bits. Alternatively and assuming that the number $log_2(M_2)$ of bits in the second sub-group of transmission bits may vary during differential multiple-transmit diversity transmission, the length exponent setup unit 26 may be activated with every change of number $log_2(M_2)$ of bits in the second sub-group of transmission bits.

Further, operatively the length exponent calculation unit 28 shown in FIG. 3 uses the results generated by the length exponent set up unit for real time coding of the second sub-group of transmission bits during differential multiple-transmit diversity transmission. Heretofore, length exponent calculation unit 28 maps transmission bits of the second group of transmission bits $[u_{k,2,1}, \ldots, u_{k,2,log_2(M_2)}]$ to a scaling factor $\delta_k$ according to the pre-determined relation established between bit patterns of the second group of transmission bits $[u_{k,2,1}, \ldots, u_{k,2,log_2(M_2)}]$ and the set of scaling factors and then calculates the next length exponent according to $$q_k = \delta_k - s(Q_{k-1} + \delta_k - M_2) \cdot M_2; \quad (12)$$

wherein s( ) is a step function having a value of 1 for non-negative arguments and a value of 0 for negative arguments; and $Q_{k-1}$ length exponent representing the absolute length of the transmission symbol vector transmitted prior to calculation of the length exponent $q_k$.

Figure 5:
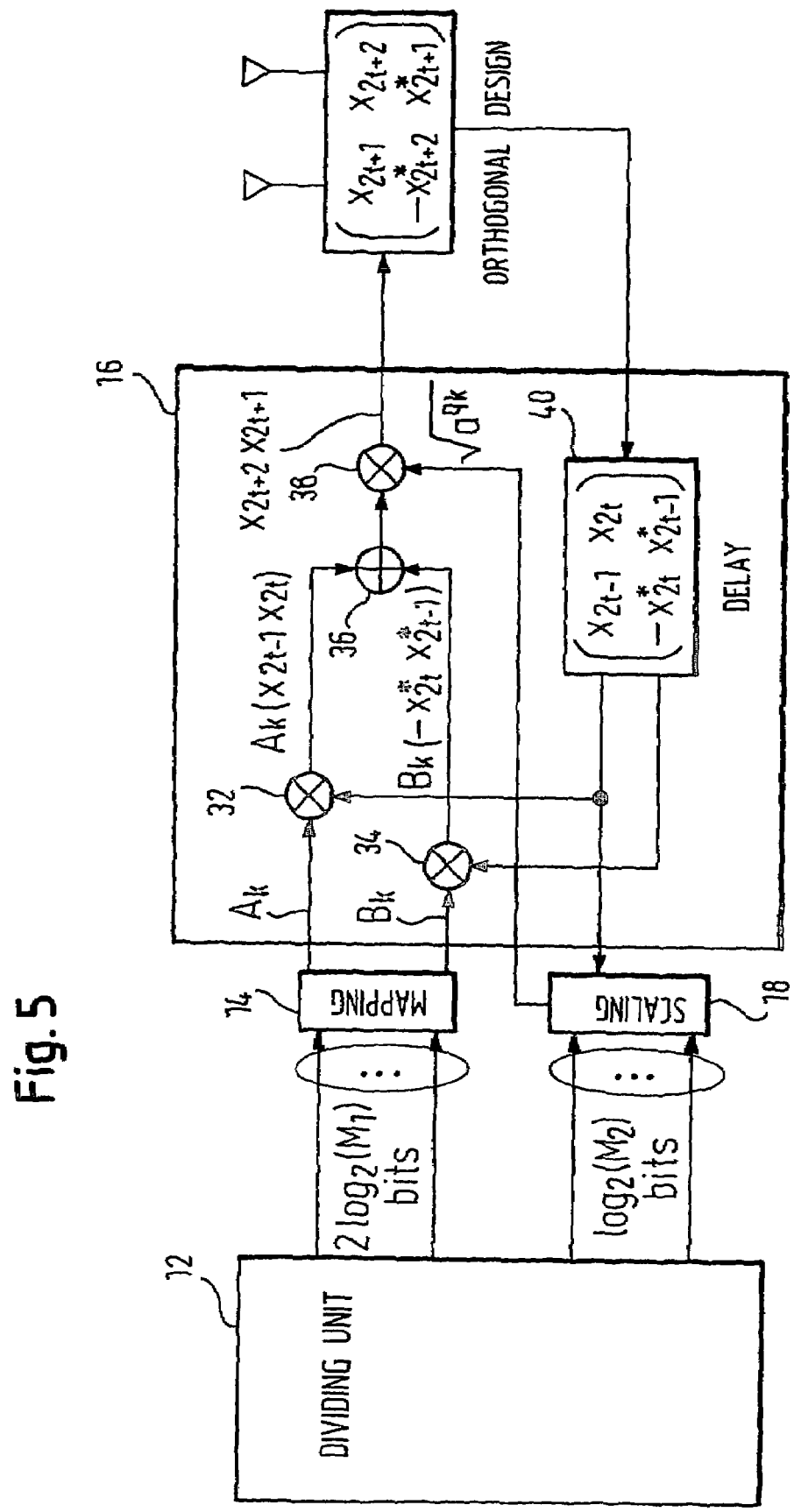
FIG. 5 shows a further detailed schematic diagram of the transmitter for achieving differential multiple-length transmit diversity according to the present invention.

FIG. 5 shows a detailed schematic diagram of the transmitter for achieving differential multiple-length transmit diversity according to the present invention. Those elements explained above with respect to FIGS. 3 and 4 are denoted using the same reference numerals and explanation thereof will be omitted.

As shown in FIG. 5, the coding unit comprises a first multiplier 32, a second multiplier 34, an adder 36, an third multiplier and a delay unit 40.

Operatively, the delay unit 40 is adapted to store an orthogonal design according to a previously transmitted transmission symbol vector. The related constellation elements form the basis for processing of equation (8) through the first multiplier 32, the second multiplier 34, and the adder 38.

Further, the generated intermediate result is forwarded to the third multiplier for processing of equation (9). Then, at time 2t+1 a new orthogonal design is set such that the symbol $x_{2t+1}$ is transmitted from antenna one and simultaneously $x_{2t+2}$ is transmitted from antenna two. In the next time slot, $-x_{2t+2}^*$ is transmitted from antenna one and $x_{2t+1}^*$ from antenna two. It should be noted that a reference space-time block code matrix $$\begin{bmatrix} x_1 & x_2 \\ -x_2^* & x_1^* \end{bmatrix} \quad (13)$$

is transmitted at the beginning of transmission which contains arbitrary symbols $x_1$ and $x_2$ taken from the $M_1$-PSK constellation.

Differential Multiple Length Diversity Reception

Basic Method of Differential Multiple Length Diversity Reception

In the following different aspects and preferred embodiment of differential multiple-length diversity reception according to the present invention will be explained. Heretofore, it is assumed that transmission symbols carry information being coded through mapping of a first subgroup of transmission bits onto constellation points of a differential transmit diversity scheme from an orthogonal design for coding the first sub-group of transmission bits, subsequent differential coding of the constellation points and previously transmitted transmission symbols for setup of a transmission symbol vector, and scaling of a length of the transmission symbol vector for coding a second sub-group of transmission bits, as outlined above.

Figure 6:
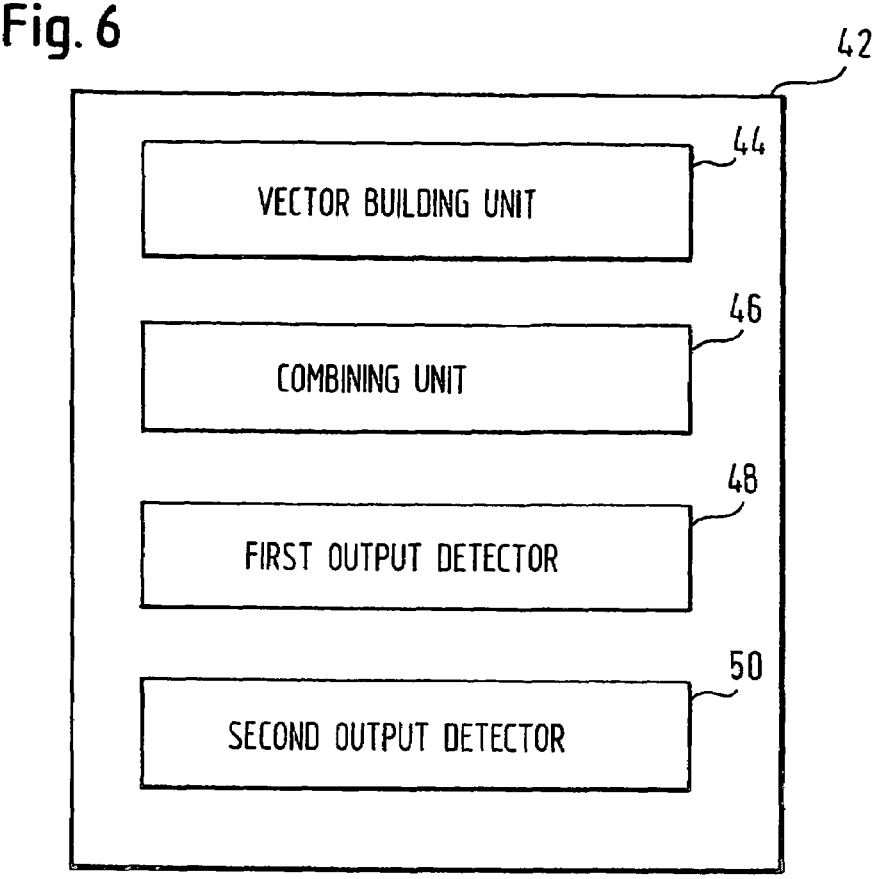
FIG. 6 shows a schematic diagram of a differential multiple diversity receiver according to the present invention.

FIG. 6 shows a schematic diagram of a differential multiple diversity receiver 42 according to the present invention.

As shown in FIG. 6, the differential multiple diversity receiver 42 comprises a vector building unit 44, a combining unit 46, a first output detector 48, and a second output detector 50.

Figure 7:
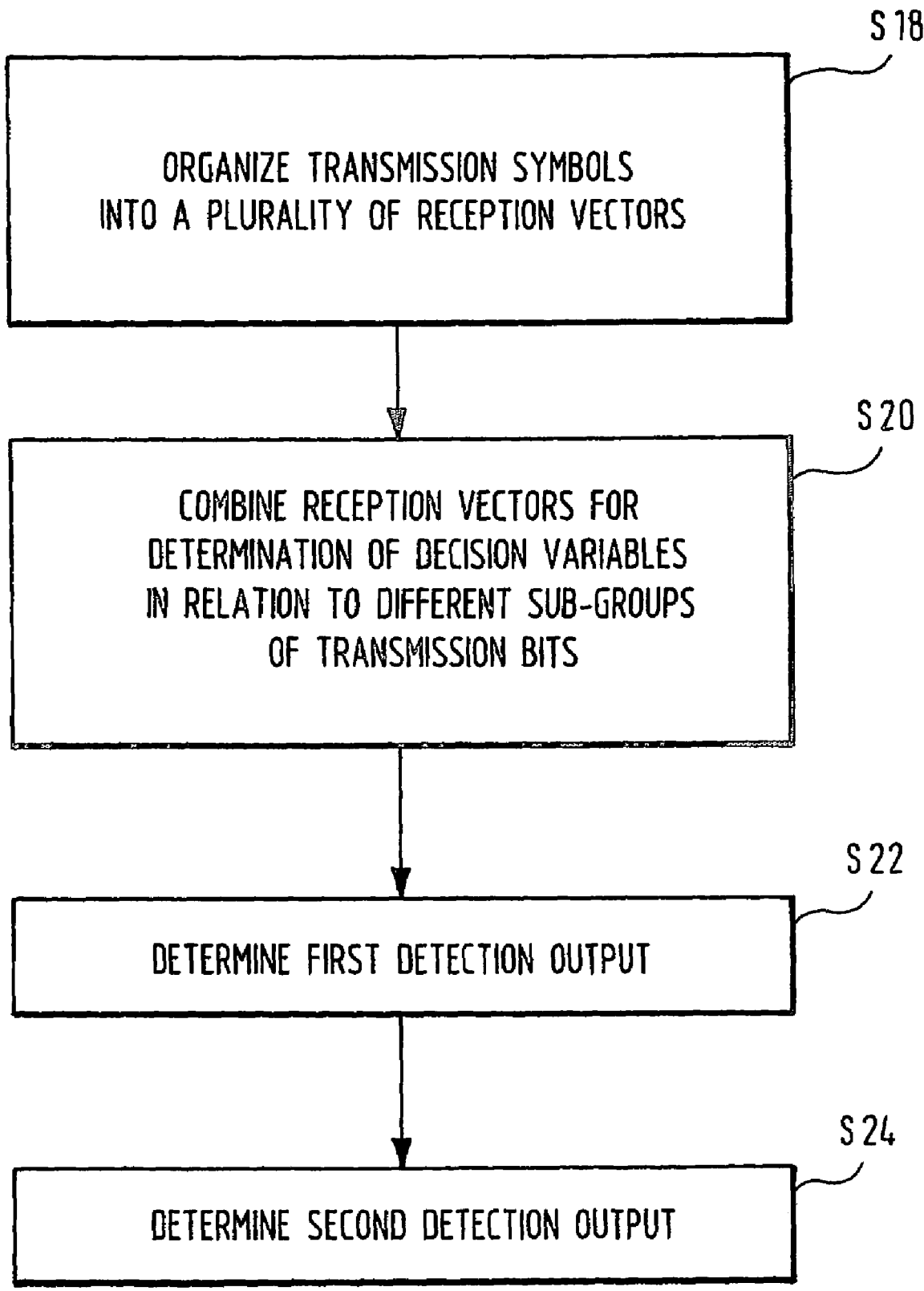
FIG. 7 shows a flowchart of operation for the differential multiple diversity receiver shown in FIG. 6.

FIG. 7 shows a flowchart of operation for the differential multiple diversity receiver 42 shown in FIG. 6.

As shown in FIG. 7, in a step S18 the vector building unit 44 organizes transmission symbols into a plurality of reception vectors according to a pre-determined scheme. In a step S20 the combining unit 46 combines the reception vectors outputted through the vector building unit 44 for determination of at least a first decision variable and a second decision variable in relation to the first sub-group of transmission bits and further for determination of a third decision variable in relation to the second sub-group of transmission bits. Then, in a step S22 the first output detector 48 determines a first detection output in relation to the first sub-group of transmission bits on the basis of the first decision variable and the second decision variable, respectively. Finally, in a step S24 the second output detector 50 determines a second detection output in relation to the second sub-group of transmission bits on the basis of the third decision variable.

In more detail, operatively the vector building unit 44 shown in FIG. 6 is adapted to build up vectors according to $$y_k = \begin{bmatrix} y_{2t-1}^{(1)} \\ y_{2t}^{(1)*} \\ \vdots \\ y_{2t-1}^{(n_R)} \\ y_{2t}^{(n_R)*} \end{bmatrix}, \quad y_{k+1} = \begin{bmatrix} y_{2t+1}^{(1)} \\ y_{2t+2}^{(1)*} \\ \vdots \\ y_{2t+1}^{(n_R)} \\ y_{2t+2}^{(n_R)*} \end{bmatrix}, \quad \bar{y}_k = \begin{bmatrix} y_{2t}^{(1)} \\ -y_{2t-1}^{(1)*} \\ \vdots \\ y_{2t}^{(n_R)} \\ -y_{2t-1}^{(n_R)*} \end{bmatrix}, \quad (14)$$

wherein
t is a time index;
$n_R$ is the number of reception antennas;
* is a complex conjugate operator; and
$y_i^{(j)}$ is a symbol received at time i at reception antenna j.

Considering the principles of differential space-time block codes as outlined above, these received vector are related to the following transmit symbol vectors:

$$x_k = \begin{bmatrix} x_{2t-1} \\ x_{2t} \end{bmatrix}, \quad x_{k+1} = \begin{bmatrix} x_{2t+1} \\ x_{2t+2} \end{bmatrix}, \quad \bar{x}_k = \begin{bmatrix} -x_{2t}^* \\ x_{2t-1}^* \end{bmatrix}, \quad (15)$$

Further, the noise superimposed during transmission of the transmit symbol vectors may be represented through noise vectors according to $$n_k = \begin{bmatrix} n_{2t-1}^{(1)} \\ n_{2t}^{(1)*} \\ \vdots \\ n_{2t-1}^{(n_R)} \\ n_{2t}^{(n_R)*} \end{bmatrix}, \quad n_{k+1} = \begin{bmatrix} n_{2t+1}^{(1)} \\ n_{2t+2}^{(1)*} \\ \vdots \\ n_{2t+1}^{(n_R)} \\ n_{2t+2}^{(n_R)*} \end{bmatrix}, \quad \bar{n}_k = \begin{bmatrix} n_{2t}^{(1)} \\ -n_{2t-1}^{(1)*} \\ \vdots \\ n_{2t}^{(n_R)} \\ -n_{2t-1}^{(n_R)*} \end{bmatrix}, \quad (16)$$

Further, in the following a linear system behavior modelling the multiple input multiple output transmission channel is represented by a matrix $\tilde{H}$ $$\tilde{H} = \begin{bmatrix} h^{(11)} & h^{(21)} \\ h^{(21)*} & -h^{(11)*} \\ \vdots & \vdots \\ h^{(1n_R)} & h^{(2n_R)} \\ h^{(2n_R)*} & -h^{(1n_R)*} \end{bmatrix}, \quad (17)$$

In view, of the above, the combing step S20 operatively carried out through the combing unit 46 shown in FIG. 6 for determination of a first decision variable $\hat{y}_1$, a second decision variable $\hat{y}_2$, and a third decision variable $\hat{y}_3$ is achieved according to:

$$\hat{y}_1 = y_k^H y_{k+1}; \quad (18)$$

$$\hat{y}_2 = \bar{y}_k^H y_{k+1}; \text{ and} \quad (19)$$

$$\hat{y}_3 = \frac{y_{k+1}^H y_{k+1}}{y_k^H y_k}; \quad (20)$$

wherein
H is operator of transposing a vector and applying the conjugate complex operator * to all vector elements.

Figure 8:
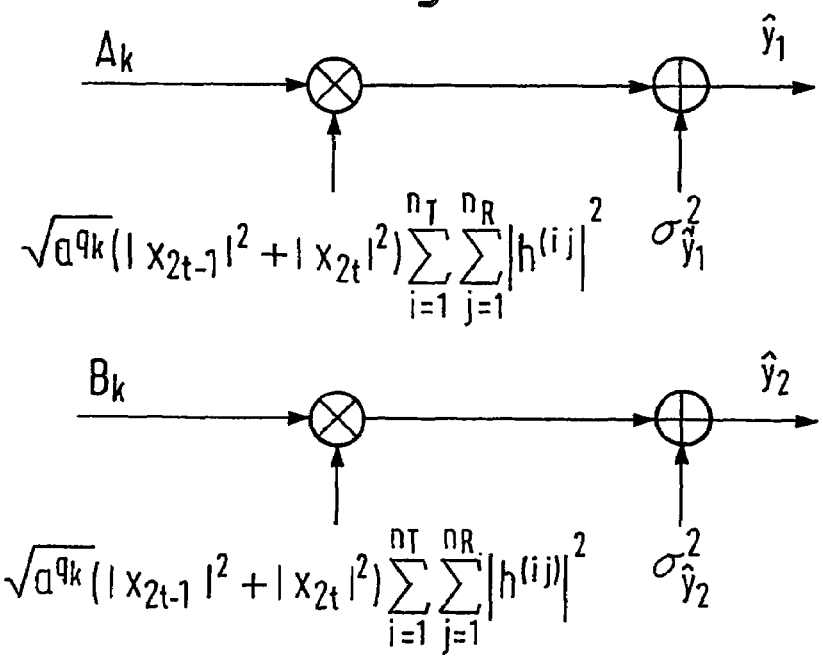
FIG. 8 shows an implication of a linear system modelling of an multiple input multiple output transmission channel and related combining of received vectors for determination of decision variables.

FIG. 8 shows an implication of the linear system modelling of the multiple input multiple output transmission channel and related combining of received vectors for determination of decision variables.

As shown in FIG. 8, for detection of the first $2 \log_2(M_1)$ bits, the simple combining according to equation (18) and (19) has transformed the fading multiple input multiple output channel into two parallel single input single output channels where a resulting channel coefficient is given by $$h_e = \sqrt{a^{q_k}} (|x_{2t-1}|^2 + |x_{2t}|^2) \sum_{i=1}^{n_T} \sum_{j=1}^{n_R} |h^{(ij)}|^2 \quad (21)$$

wherein
$n_T$ is the number of transmit antennas;
$n_R$ is the number of reception antennas;
$h^{(ij)}$ is the channel gain from transmit antenna i to reception antenna j;
$x_{2t-1}$, $x_{2t}$ are transmissions symbols, and
$\sqrt{a^{q_k}}$ is the scaling factor, as outlined above.

Further, additive noise in the equivalent channels $\sigma_{\hat{y}_1}^2 = \sigma_{\hat{y}_2}^2$ is Gaussian with variance $$\sigma_{\hat{y}_1}^2 = \sigma_{\hat{y}_2}^2 = \sigma^2 h_e \frac{1 + a^{q_k}}{\sqrt{a^{q_k}}}. \quad (22)$$

wherein $\sigma^2$ is the variance per real dimension of the noise at each receive antenna.

Figure 9:
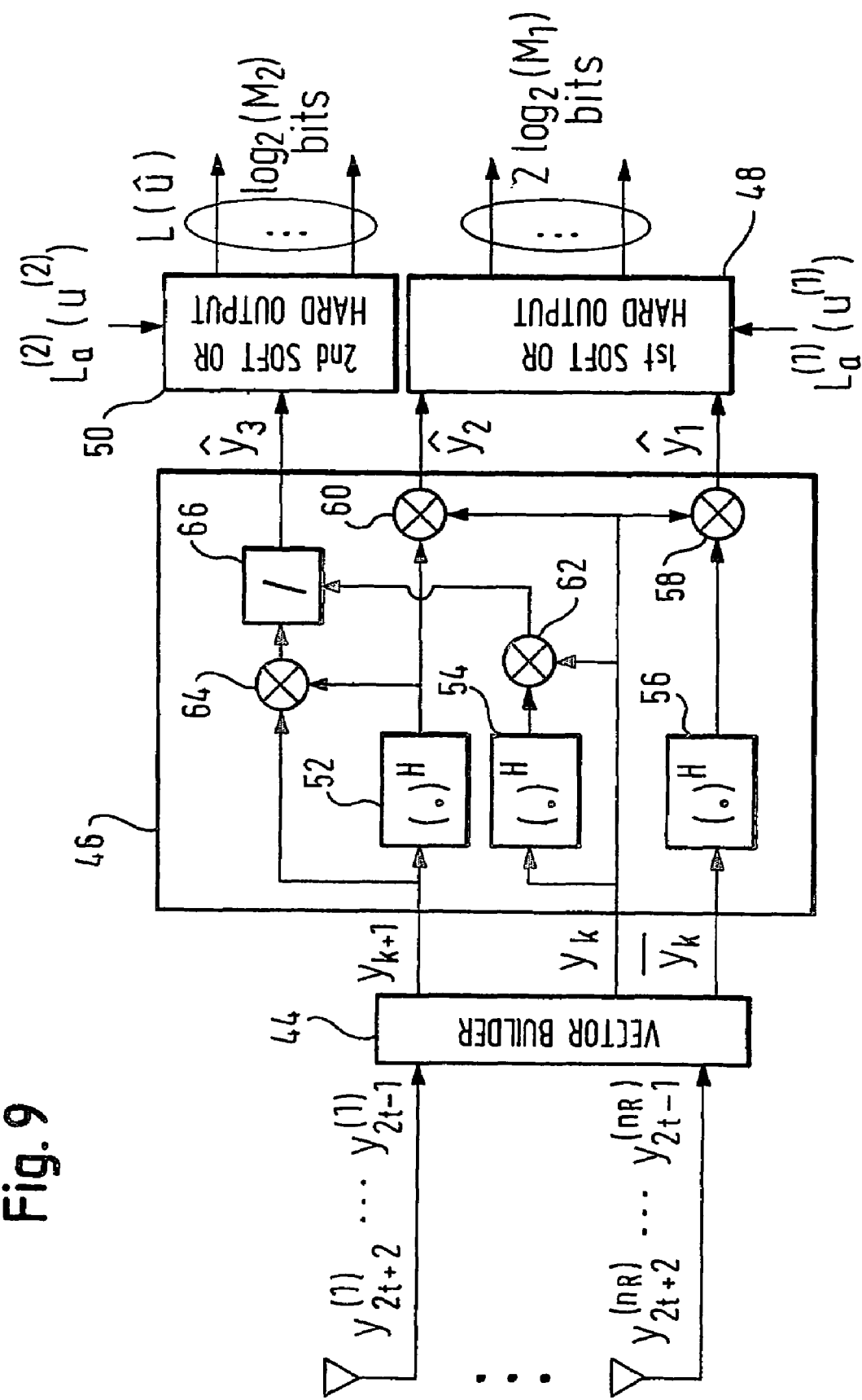
FIG. 9 shows a further detail schematic block diagram of the differential multiple diversity receiver shown in FIG. 6.

FIG. 9 shows a further detail schematic block diagram of the differential multiple diversity receiver shown in FIG. 6.

As shown in FIG. 9, the received vectors $y_{k+1}$, $y_k$, and $\bar{y}_k$ generated in the vector builder 44 are input to the combining unit 46, for determination of the first decision variable $\hat{y}_1$, the second decision variable $\hat{y}_2$, and the third decision variable $\hat{y}_3$, respectively.

As shown in FIG. 9, the combining unit 46 comprises a first unit receiving the vector $y_{k+1}$ at its input and being adapted to transponse a complex valued vector and the modify each vector element to the conjugate complex thereof, in short referred to as H-unit 52 in the following. Further, the combining unit 46 comprises a second H-unit 54 receiving the vector $y_k$ at its input. Still further, the combining unit 46 comprises a third H-unit 56 receiving the vector $\bar{y}_k$ at its input.

As shown in FIG. 9, the output of the third H-unit 56 and the received vector $y_k$ are supplied to a first multiplier 58 of the combining unit 46. The output of the first multiplier 58 constitutes the first decision variable $\hat{y}_1$.

As shown in FIG. 9, the output of the first H-unit 54 and the received vector $y_k$ are supplied to a second multiplier 60 of the combining unit 46. The output of the second multiplier 60 constitutes the second decision variable $\hat{y}_2$.

As shown in FIG. 9, the received vector $y_k$ and the conjugate complex thereof outputted by the second H-unit 54 are multiplied by a third multiplier 62 of the combining unit 46. Further, the received vector $y_{k+1}$ and the conjugate complex thereof outputted by the first H-unit 52 are multiplied by a fourth multiplier 64 of the combining unit 46. The output of the fourth multiplier 64 is divided by the output of the third multiplier 62 by a divider 66, the output of which constitutes the third decision variable $\hat{y}_3$.

As shown in FIG. 9, the first decision variable $\hat{y}_1$ and the second decision variable $\hat{y}_2$ are supplied to the first output detector 48 shown in FIG. 6 and being operated with respect to the first sub-group of transmission bits. Here, the first output detector 48 may be either of the hard or the soft detection type as will be explained in detail in the following. In the latter case the first output detector 48 will receive a vector $L_a^{(1)}$ of a priori log likelihood values corresponding to the first sub-group of transmission bits. The vector $L_a^{(1)}$ of a priori log likelihood values may be known, e.g., from information source statistics or be generated through turbo feedback. The output of the first output detector 48 is a number of $2\log_2(M_1)$ bit decisions corresponding to the first sub-group of transmission bits.

As shown in FIG. 9, the third decision variable $\hat{y}_3$ is supplied to the second output detector 48 shown in FIG. 6 and being operated with respect to the second sub-group of transmission bits. Here, also the second output detector 48 may be either of the hard or the soft detection type as will be explained in detail in the following. In the latter case the second output detector 50 will receive a vector $L_a^{(2)}$ of a priori log likelihood values corresponding to the second sub-group of transmission bits. The vector $L_a^{(2)}$ of a priori log likelihood values may again be known, e.g., from information source statistics or be generated through turbo feedback. The output of the second output detector 50 is a number of $\log_2(M_2)$ bit decisions corresponding to the second sub-group of transmission bits.

Differential Multiple Length Diversity Reception

Before explaining details of differential multiple length diversity reception according to the present invention, in the following the expressions given for determination of decision variables above will be further analyzed. This will form the basis for subsequent explanation of output detection in the sense of the present invention.

Using the linear system model of the multiple input multiple output channel, the received vectors may be represented according to:

$$y_k = \tilde{H}x_k + n_k, \quad (23)$$

$$y_{k+1} = \tilde{H}x_{k+1} + n_{k+1}, \quad (24)$$

$$\bar{y}_k = \tilde{H}\bar{x}_k + \bar{n}_k. \quad (25)$$

The matrix $\tilde{H}$ satisfies $$\tilde{H}^H \tilde{H} = \left( \sum_{i=1}^{n_T} \sum_{j=1}^{n_R} |h^{(ij)}|^2 \right) I_{n_T}, \quad (26)$$

where $I_{n_T}$ is the $n_T \times n_T$ unity matrix.

From (23) and (24) the result for the first decision variable $\hat{y}_1$ is $$\hat{y}_1 = y_k^H y_{k+1} \quad (27)$$
$$= x_k^H \tilde{H}^H \tilde{H} x_{k+1} + x_k^H \tilde{H}^H n_{k+1} + n_k^H \tilde{H} x_{k+1} + n_k^H n_{k+1}.$$

Using (26) and (15), the first term in (27) becomes $$x_k^H \tilde{H}^H \tilde{H} x_{k+1} = \sqrt{a^{q_k}} \left( \sum_{i=1}^{n_T} \sum_{j=1}^{n_R} |h^{(ij)}|^2 \right) (A_k(|x_{2t-1}|^2 + |x_{2t}|^2)). \quad (28)$$

Similarly, in order to detect $B_k$ the second decision variable $\hat{y}_2$ may be represented according to $$\hat{y}_2 = \bar{y}_k^H y_{k+1} \quad (29)$$
$$= \bar{x}_k^H \tilde{H}^H \tilde{H} x_{k+1} + \bar{x}_k^H \tilde{H}^H n_{k+1} + \bar{n}_k^H \tilde{H} x_{k+1} + \bar{n}_k^H n_{k+1}.$$

Similar as for $\hat{y}_1$, using (26) and (15), the first term in (29) becomes $$\bar{x}_k^H \tilde{H}^H \tilde{H} x_{k+1} = \sqrt{a^{q_k}} \left( \sum_{i=1}^{n_T} \sum_{j=1}^{n_R} |h^{(ij)}|^2 \right) (B_k(|x_{2t-1}|^2 + |x_{2t}|^2)). \quad (30)$$

In order to detect the last $\log_2(M_2)$ bits in the second sub-group of Transmission bits the third decision variable $\hat{y}_3$ may be represented according to $$\hat{y}_3 = \frac{y_{k+1}^H y_{k+1}}{y_k^H y_k} \quad (31)$$
$$= \frac{x_{k+1}^H \tilde{H}^H \tilde{H} x_{k+1} + x_{k+1}^H \tilde{H}^H n_{k+1} + n_{k+1}^H \tilde{H} x_{k+1} + n_{k+1}^H n_{k+1}}{x_k^H \tilde{H}^H \tilde{H} x_k + x_k^H \tilde{H}^H n_k + n_k^H \tilde{H} x_k + n_k^H n_k},$$

where $$a^{q_k} = \frac{x_{k+1}^H \tilde{H}^H \tilde{H} x_{k+1}}{x_k^H \tilde{H}^H \tilde{H} x_k} \quad (32)$$
$$= \frac{|x_{2t+2}|^2 + |x_{2t+1}|^2}{|x_{2t-1}|^2 + |x_{2t}|^2}.$$

In the following the use of decision variables $\hat{y}_3$, $\hat{y}_3$, and $\hat{y}_3$ as outlined above during the process of output detection will be explained with reference to FIGS. 10 and 11, respectively.

Figure 10:
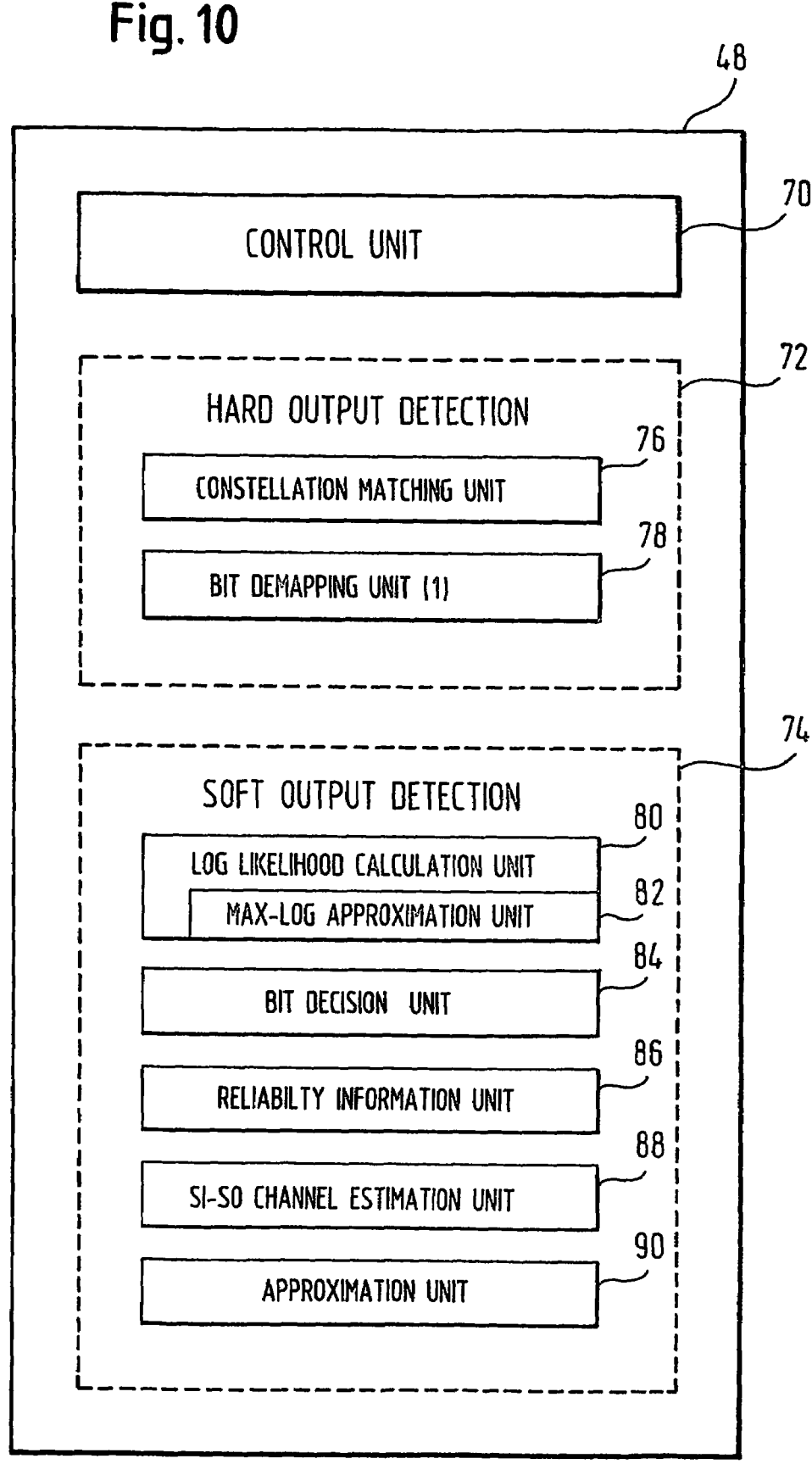
FIG. 10 shows a further detailed schematic diagram of the first output detector shown in FIG. 6.

As shown in FIG. 10, the first hard output detection unit 68 comprises a first control unit 70, a first hard output detection unit 72, and a second soft output detection unit 74.

As shown in FIG. 10, the first hard output detection unit 72 comprises a constellation matching unit 76 and a first bit demapping unit 78.

As shown in FIG. 10, the first soft output detection unit 74 comprises a first log likelihood calculation unit 80 which—according to a preferred embodiment of the present invention—comprises a first max-log approximation unit 82. Further sub-units of the first soft output detection unit 74 are a first bit decision unit 84, a first reliability information unit 86, a single input single output channel estimation unit 88, and a first approximation unit 90.

Figure 11:
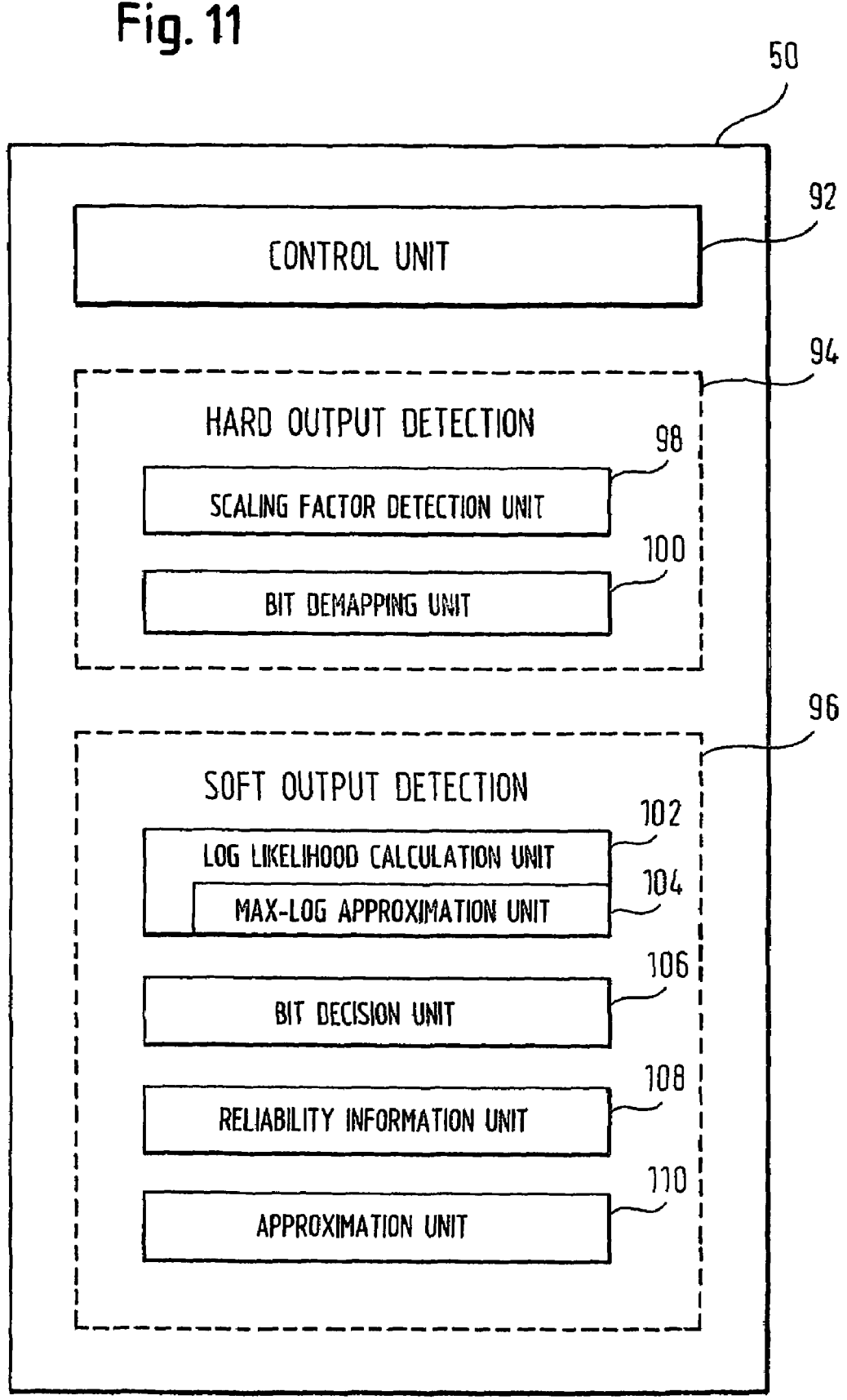
FIG. 11 shows a further detailed schematic diagram of the second output detector shown in FIG. 6.

As shown in FIG. 11, the second output detection unit 50 comprises a second control unit 92, a second hard output detection unit 94, and a second soft output detection unit 96.

As shown in FIG. 11, the second hard output detection unit 94 comprises a scaling factor detection unit 98 and second bit demapping unit 100.

As shown in FIG. 11, the second soft output detection unit 96 comprises a second log likelihood calculation unit 102 which—according to a preferred embodiment of the present invention—comprises a second max-log approximation unit 104. Further sub-units of the second soft output detection unit 96 are a second bit decision unit 106, a second reliability information unit 108, and a second approximation unit 110.

Hard Output Detection—First Group of Transmission Bits

Operatively, the first control unit 70 of the first output detector 48 will activate either the first hard output detection unit 72 or the first soft output detection unit 74, depending of the desired detection quality and/or available computational resources. Therefore, a first mode of operation of the first output detector 48 relates to hard output detection with respect to the first sub-group of transmission bits.

For a hard decision on the $2\log_2(M_1)$ bits in the first sub-group of transmission bits, operatively the constellation matching unit 76 is adapted to compute the closest constellation vector $[A(i), B(i)]$ to $[\hat{y}_1\ \hat{y}_2]$ according to $$(\hat{A}_k \hat{B}_k) = \arg\min_i \{|\hat{y}_1 - A(i)|^2 + |\hat{y}_2 - B(i)|^2\}. \quad (33)$$

Further, operatively the first bit demapping unit 78 is adapted to calculate bits $u_{k,1}, \ldots, 2\log_2(M_1)$ by demapping from $\hat{A}_k$ and $\hat{B}_k$.

Hard Output Detection—Second Group of Transmission Bits

Similar to the first output detector 48, also the second control unit 92 of the second output detector 50 will activate either the second hard output detection unit 94 or the second soft output detection unit 96, again depending of the desired detection quality and/or available computational resources. Therefore, a first mode of operation of the second output detector 50 relates to hard output detection with respect to the second sub-group of transmission bits.

Operatively, the scaling factor detection unit 98 calculates a hard decision by choosing the length factor $a^{q_k}$ which is closest to $\hat{y}_3$ according to $$\hat{a}^{q_k} = \arg\min |\hat{y}_3 - a^{q(i)}|, q(i) \in \{-M_2+1, \ldots, M_2-1\} \quad (34)$$

wherein $\{-M_2+1, \ldots, M_2-1\}$ is a set of all candidate length exponents and a is a constant.

Further, operatively the second bit demapping unit 100 is adapted to calculate the second sub-group of transmission bits through determining the value $q_k$ from $\hat{a}^{q_k}$, through determining the transmission bits corresponding to the value of $q_k$, and subsequent demapping according to the operation of the scaling unit 18 shown in FIG. 3 and as explained above. In other words, in knowledge the length exponent $q_k$ the related set of bits in the second subgroup of input bits may be demapped as reverse operation to the mapping scheme applied at the transmitter side.

Differential Multiple Length Diversity Reception—Soft Output Detection

Basic Considerations

Generally, in wireless communication systems the differential transmit diversity scheme may concatenated with an outer forward error correction FEC code. Therefore, soft output differential detection may be preferable over hard output detection. As will be shown in the following, soft output detection with respect to differential multiple diversity reception may arrive at separate decisions on the first $2\log_2(M_1)$ bits which determine the constellation vector $(A_k, B_k)$ and the remaining $\log_2(M_2)$ bits which determine the length of the transmit symbol vector in successive matrices, preferable the difference thereof.

However and as already outlined above, soft output detection as explained in the following may as well be combined with hard output detection across different sub-groups of transmission bits to a arrive at a hybrid output detection approach. This may be of particular advantage when different subgroups of transmission bits carry information of different relevance requiring different levels of error protection.

Further, it should be noted that soft output detection for the first sub-group of transmission bits requires knowledge of channel parameters $h_e$ and $\sigma_{\hat{y}_1}^2 = \sigma_{\hat{y}_2}^2$ as defined above and that soft output detection for the second sub-group of transmission bits requires knowledge of a channel parameter $\sigma_{\hat{y}_3}^2$, i.e. a measure of additive noise variance in an equivalent transmission channel for the second sub-group of input bits. As for multiple-length differential transmit diversity the values of $\sigma_{\hat{y}_1}^2 = \sigma_{\hat{y}_2}^2$ are different from $\sigma_{\hat{y}_3}^3$ noise variance is to be to considered appropriately during soft output detection for the first sub-group of transmission bits and the second sub-group of transmission bits.

As will be shown in the following, according to the present invention this is achieved through approximation of the values of $\sigma_{\hat{y}_1}^2 = \sigma_{\hat{y}_2}^2$ and $\sigma_{\hat{y}_3}^2$ in terms of $\sigma^2$—i.e., the variance per real dimension at each receiver antenna for actual transmission channels in contrast to modelled equivalent channels—and further in terms of the decision variables $\hat{y}_1, \hat{y}_2$, and $\hat{y}_3$, respectively.

As will also be shown in the following, this approach allows for non-coherent soft output detection without application of channel estimation techniques. In view of differential transmit diversity schemes, estimation of variance per real dimension at each receiver antenna for actual transmission channels is not mandatory when an outer Viterbi type decoder is concatenated to the soft output detection units. This is because the variance per real dimension at each receiver antenna for actual transmission channels is only a constant factor in all log likelihood values passed to the outer Viterbi type decoder. However, such a constant factor may be set to any constant value and has no impact on the output of the outer Viterbi type decoder.

Further to the above it should be noted, that while the a posteriori probability values the outer Viterbi type decode will be scaled by a same factor even with application of a turbo scheme this will cause no degradation as long as only max-log components are applied and no a-priori information gained outside the turbo scheme is used, as explained in G. Bauch and V. Franz: *A Comparison of Soft-in/Soft-out Algo-* rithm for "Turbo Detection". In International Conference on Telecommunications (ICT), June 1998, incorporated herein by reference.

Although not mandatory, it should be noted that a further solution for the situation discussed above, in particular with respect to the values of $h_e$ and $\sigma_{\hat{y}_1}^2$ is the application of channel estimation techniques, e.g., on the output generated through the combination of received vectors. Here, the provision of differential transmit diversity scheme in combination with combining allows for reducing the problem of multiple input multiple output channel estimation to single input single output channel estimation for which standard techniques can be applied, e.g., minimum mean square error MMSE channel estimation or correlative channel estimation techniques using training sequences. A particular advantage of this approach is that it is very useful for wireless communication systems which require coherent detection in subsequent stages, e.g., multi-carrier code division multiple access CDMA wireless communication systems.

Soft Output Detection—First Group of Transmission Bits

Operatively, the first log likelihood calculation unit 80 shown in FIG. 10 is adapted to calculate log-likelihood values for the first sub-group of transmission bits according to $$L^{(1)}(\hat{u}_{k,l}) = \log \frac{p(u_{k,l} = +1 \mid \hat{y}_1, \hat{y}_2)}{p(u_{k,l} = -1 \mid \hat{y}_1, \hat{y}_2)} \quad (35)$$

wherein further to the definitions already given above
k is a time index;
a vector of the first sub-group of transmission bits $u_k$ of dimension $2\log_2(M_1)$ is mapped onto one of the $M_1^2$ constellation elements of the differential transmit diversity scheme and $u_{k,l}$ is a transmission bit at position l in $u_k$;
$p(u_{k,l}=+1|\hat{y}_1, \hat{y}_2)$ is a conditional probability for $u_{k,l}=+1$ in view of determined decision variables $\hat{y}_1$ and $\hat{y}_2$;
$p(u_{k,l}=-1|\hat{y}_1, \hat{y}_2)$ is a conditional probability for $u_{k,l}=-1$ in view of determined decision variables $\hat{y}_1$ and $\hat{y}_2$; and
$L^{(1)}(\hat{u}_{k,l})$ is the soft output for the first sub-group of transmission bits.

Further, operatively the first bit decision unit 84 shown in FIG. 10 is adapted to determine a bit decision for the first sub-group of transmission bits according to $$\hat{u}_{k,l} = \text{sign}(L^{(1)}(\hat{u}_{k,l})) \quad (36)$$

Further, operatively the reliability information unit 86 shown in FIG. 10 is adapted to determine reliability information for the first sub-group of transmission bits according to $$|L^{(1)}(\hat{u}_{k,l})|. \quad (37)$$

As shown in FIG. 10, according to a preferred embodiment of the present invention the first log likelihood calculation unit 80 contains a first max log approximation unit 82. In the following, the theory underlying the operation of the first max log approximation unit 82 will be explained.

The basic term for calculation log likelihood values for the first sub-group of transmission bits may be reformulated according to $$L^{(1)}(\hat{u}_{k,l}) = \log \frac{\sum_{\substack{(A(i),B(i)) \\ u_{k,l}(i)=+1}} p(\hat{y}_1, \hat{y}_2 \mid A(i), B(i)) \prod_l P_a(u_{k,l}(i))}{\sum_{\substack{(A(i),B(i)) \\ u_{k,l}(i)=-1}} p(\hat{y}_1, \hat{y}_2 \mid A(i), B(i)) \prod_l P_a(u_{k,l}(i))}$$

$$= \log \frac{\sum_{\substack{(A(i),B(i)) \\ u_{k,l}(i)=+1}} e^{\frac{1}{\sigma_{\hat{y}_1}^2} h_e [\text{Re}\{A(i)\hat{y}_1^* + B(i)\hat{y}_2^*\}] + \frac{1}{2} u^{(1)}(i)^T L_a^{(1)}(u)}}{\sum_{\substack{(A(i),B(i)) \\ u_{k,l}(i)=-1}} e^{\frac{1}{\sigma_{\hat{y}_1}^2} h_e [\text{Re}\{A(i)\hat{y}_1^* + B(i)\hat{y}_2^*\}] + \frac{1}{2} u^{(1)}(i)^T L_a^{(1)}(u)}},$$

wherein further to the definitions given above
the sum in the nominator is taken over all constellation vectors (A(i), B(i)) associated with $u_{k,l}(i)=+1$;
the sum in the denominator is taken over all constellation vectors (A(i), B(i)) associated with $u_{k,l}(i)=-1$;
$P_a(u_{k,l}(i))$ is an a priori probability for bit $u_{k,l}(i)$;
$L_a(u_{k,l})$ is a-priori log-likelihood ratio for bit $u_{k,l}(i)$;
$u^{(1)}(i)$ is a vector candidate corresponding to the first sub-group of transmission bits; and
$L_a^{(1)}$ is a vector of a priori log-likelihoods corresponding to the first sub-group of transmission bits.

Further, this equation can be evaluated using the Jacobian logarithm according to $$\ln[e^{\delta_1} + e^{\delta_2}] = \max\{\delta_1, \delta_2\} + f_c(|\delta_1 - \delta_2|), \quad (38)$$

The term $$f_c(|\delta_1 - \delta_2|) = \ln(1 + e^{-|\delta_1 - \delta_2|}) \quad (39)$$

is a correction term which can be implemented, e.g, as a look-up table.

The max-log approximation 82 shown in FIG. 10 is adapted to obtain max-log approximations of max likelihood values for the first sub-group of transmission bits by neglecting the correction term $f_c$ in (39) according to:

$$L^{(1)}(\hat{u}_{k,l}) \approx \quad (40)$$

$$\max_{\substack{(A(i),B(i)) \\ u_{k,l}(i)=+1}} \left\{ \frac{1}{\sigma_{\hat{y}_1}^2} h_e[\text{Re}\{A(i)\hat{y}_1^* + B(i)\hat{y}_2^*\}] + \frac{1}{2} u^{(1)}(i)^T L_a^{(1)}(u) \right\} -$$

$$\max_{\substack{(A(i),B(i)) \\ u_{k,l}(i)=-1}} \left\{ \frac{1}{\sigma_{\hat{y}_1}^2} h_e[\text{Re}\{A(i)\hat{y}_1^*\} + \text{Re}\{B(i)\hat{y}_2^*\}] + \frac{1}{2} u^{(1)}(i)^T L_a^{(1)}(u) \right\}.$$

wherein further to the definitions given above
[A(i)B(i)] is a vector of related constellation points of the differential transmit diversity scheme with $i \in \{1, \ldots, M_1\}$;
the first max operator is applied to all constellations points [A(i)B(i)] of the differential transmit diversity scheme being related to transmission bits $u_{k,l}(i)$ having a value of +1;
the second max operator is applied to all constellations points [A(i)B(i)] of the differential transmit diversity scheme being related to transmission
bits $u_{k,l}(i)$ having a value of −1;
* is complex conjugate operator;
Re is a real part operator; and
T is a transpose operator.

For the further explanation of operation of the first max-log approximation unit 82 shown in FIG. 10, it may be assumed here that approximations to the values of the resultant channel coefficient $h_e$ and additive noise variance in an equivalent transmission channel for the first sub-group of transmission bits $\sigma_{\hat{y}_1}^2$ are available through operation of the first approximation unit 90 or through operation of the single input single output channel estimation unit 88 shown in FIG. 10, which operations will be explained in the following section.

In view of given values for the resultant channel coefficient $h_e$ and for the additive noise variance in the equivalent transmission channel for the first sub-group of transmission bits $\sigma_{\hat{y}_1}^2$ and considering that such values are expressed also in terms of variance per real dimension a $\sigma^2$ at each antenna and the values of the decisionvariables—as outlined above—, the value of $L^{(1)}(\hat{u}_{k,l})$ can be modified through multiplication with $\sigma^2$ and use of available approximation values to $$L^{(1)}(\hat{u}_{k,l}) \approx \max_{\substack{(A(i),B(i)) \\ u_{k,l}(i)=+1}} \left\{ \frac{\sigma^2}{\sigma_{\hat{y}_1}^2} h_e [\text{Re}\{A(i)\hat{y}_1^* + B(i)\hat{y}_2^*\}] + \frac{\sigma^2}{2} u^{(1)}(i)^T L_a^{(1)}(u) \right\} - \max_{\substack{(A(i),B(i)) \\ u_{k,l}(i)=-1}} \left\{ \frac{\sigma^2}{\sigma_{\hat{y}_1}^2} h_e [\text{Re}\{A(i)\hat{y}_1^*\} + \text{Re}\{B(i)\hat{y}_2^*\}] + \frac{\sigma^2}{2} u^{(1)}(i)^T L_a^{(1)}(u) \right\}$$

$$\approx \max_{\substack{(A(i),B(i)) \\ u_{k,l}(i)=+1}} \left\{ \frac{\sqrt{|\hat{y}_3|}}{1+|\hat{y}_3|} [\text{Re}\{A(i)\hat{y}_1^* + B(i)\hat{y}_2^*\}] + \frac{\sigma^2}{2} u^{(1)}(i)^T L_a^{(1)}(u) \right\} - \max_{\substack{(A(i),B(i)) \\ u_{k,l}(i)=-1}} \left\{ \frac{\sqrt{|\hat{y}_3|}}{1+|\hat{y}_3|} [\text{Re}\{A(i)\hat{y}_1^*\} + \text{Re}\{B(i)\hat{y}_2^*\}] + \frac{\sigma^2}{2} u^{(1)}(i)^T L_a^{(1)}(u) \right\} \quad (41)$$

for $l=1, \ldots, 2\log_2(M_1)$. It should be noted, that the log-likelihood values achieved through this representation are calculated by the first max-log approximation unit 82 shown in FIG. 10, They are scaled by a factor of $\sigma^2$ compared to actual log-likelyhood values. As outlined above, this does not construe a problem as $\sigma^2$ is assumed to be constant during transmission of one frame.

Approximation of Channel Parameters—First Group of Transmission Bits

As outlined above, evaluation of log likelihood ratio values with respect to the first sub-group of transmission bits necessiates an approximation for values of the resultant channel coefficient $h_e$ and additive noise variance in an equivalent transmission channel for the first sub-group of input bits $\sigma_{\hat{y}_1}^2$. Heretofore, the first approximation unit 90 shown in FIG. 10 is adapted to derive such approximation values in a way as explained in the following.

Neglecting the noise, according to the present invention values of $h_e^2$ and $a^{qk}$ may be approximated according to $$h_e^2 \approx |\hat{y}_1|^2 + |\hat{y}_2|^2 \quad (42)$$

and $$a^{qk} \approx |\hat{y}_3|, \quad (43)$$

Consequently, $\sigma_{\hat{y}_1}^2$ according to (22) can be approximated by $$\sigma_{\hat{y}_1}^2 = \sigma^2 h_e \frac{1+a^{qk}}{\sqrt{a^{qk}}} \approx \sigma^2 (1+|\hat{y}_3|) \sqrt{\frac{|\hat{y}_1|^2 + |\hat{y}_2|^2}{|\hat{y}_3|}} \quad (44)$$

As alternative to the above, the single input single output channel estimation unit 88 shown in FIG. 10 may derive approximations to the resultant channel coefficient $h_e$ and additive noise variance in an equivalent transmission channel for the first sub-group of transmission bits $\sigma_{\hat{y}_1}^2$ through application of standard estimation techniques, e.g., minimum mean squared error MMSE channel estimation or correlative channel estimation with training sequences.

Soft Output Detection—Second Group of Transmission Bits

Operatively, the second log likelihood calculation unit 102 shown in FIG. 11 is adapted to calculate log-likelihood values for the second sub-group of transmission bits according to $$L^{(2)}(\hat{u}_{k,l}) = \log \frac{p(u_{k,l}=+1 \mid \hat{y}_3)}{p(u_{k,l}=-1 \mid \hat{y}_3)} \quad (45)$$

wherein k is a time index;

$u_{k,l}$ is a transmission bit at position l in a vector $u_k^{(2)}$ of dimension $\log_2(M_2)$, the vector $u_k$ being set up from the second sub-group of transmission bits;

$\hat{y}_3$ is the third decision variable;

$p(u_{k,l}=+1|\hat{y}_3)$ is a conditional probability for $u_{k,l}=+1$ in view of the decision variable $\hat{y}_3$;

$p(u_{k,l}=-1|\hat{y}_3)$ is a conditional probability for $u_{k,l}=-1$ in view of the decision variable $\hat{y}_3$; and $L^{(2)}(\hat{u}_{k,l})$ is the soft output for the second sub-group of transmission bits.

Further, operatively the second bit decision unit 106 shown in FIG. 11 is adapted to determine a bit decision for the second sub-group of transmission bits according to $$\hat{u}_{k,l} = \text{sign}(L^{(2)}(\hat{u}_{k,l})) \quad (46)$$

Further, operatively the second reliability information unit 108 shown in FIG. 11 is adapted to determine reliability information for the second sub-group of transmission bits according to $$|L^{(2)}(\hat{u}_{k,l})|. \tag{47}$$

As shown in FIG. 11, according to a preferred embodiment of the present invention the second log likelihood calculation unit 102 contains a second max log approximation unit 104. In the following, the theory underlying the operation of the second max log approximation unit 104 will be explained.

For the soft output detection of the $\log_2(M_2)$ bits in the second sub-group of transmission bits, according to the present invention it is proposed to neglect the noise terms $n_{k+1}^H n_{k+1}$ and $n_k^H n_k$ and take the logarithm of (31):

$$\log \hat{y}_3 = \log(x_{k+1}^H \tilde{H}^H \tilde{H} x_{k+1} + x_{k+1}^H \tilde{H}^H n_{k+1} + n_{k+1}^H \tilde{H} x_{k+1}) - \log(x_k^H \tilde{H}^H \tilde{H} x_k + x_k^H \tilde{H}^H n_k + n_k^H \tilde{H} x_k). \tag{48}$$

Equation (48) can be approximated by the first two terms of the Taylor series $$f(a+b) = f(a) + \frac{b}{1!}f'(a) \tag{49}$$

which yields $$\log \hat{y}_3 \approx \log \frac{(|x_{2t+2}|^2 + |x_{2t+1}|^2)}{(|x_{2t-1}|^2 + |x_{2t}|^2)} +$$

$$\frac{x_{k+1}^H \tilde{H}^H n_{k+1} + n_{k+1}^H \tilde{H} x_{k+1}}{(|x_{2t+2}|^2 + |x_{2t+1}|^2) \sum_{i=1}^{n_T} \sum_{j=1}^{n_R} |h^{(ij)}|^2} -$$

$$\frac{x_k^H \tilde{H}^H n_k + n_k^H \tilde{H} x_k}{(|x_{2t-2}|^2 + |x_{2t}|^2) \sum_{i=1}^{n_T} \sum_{j=1}^{n_R} |h^{(ij)}|^2}$$

$$= \log a^{qk} + \frac{x_{k+1}^H \tilde{H}^H n_{k+1} + n_{k+1}^H \tilde{H} x_{k+1}}{(|x_{2t+2}|^2 + |x_{2t+1}|^2) \sum_{i=1}^{n_T} \sum_{j=1}^{n_R} |h^{(ij)}|^2} -$$

$$\frac{x_k^H \tilde{H}^H n_k + n_k^H \tilde{H} x_k}{(|x_{2t-2}|^2 + |x_{2t}|^2) \sum_{i=1}^{n_T} \sum_{j=1}^{n_R} |h^{(ij)}|^2}. \tag{50}$$

The noise in (50) is white and Gaussian with variance $$\sigma_{\hat{y}_3}^2 = \frac{4\sigma^2}{h_e}\left(\frac{1+a^{qk}}{\sqrt{a^{qk}}}\right). \tag{51}$$

Therefore, it follows $$p(\log \hat{y}_3 \mid q(i)) = \frac{1}{2\pi\sigma_{\hat{y}_3}^2} e^{-\frac{|\log \hat{y}_3 - \log a^{q(i)}|^2}{2\sigma_{\hat{y}_3}^2}}. \tag{52}$$

From the explanations of differential multiple length transmit diversity given above it should be clear that not all possible q(i) have the same probability. According to the present invention, this is considered as a priori probability $P_a(q(i))$ in the a posteriori log-likelihood ratio with respect to bits $u_{k,l}$, $l=2\log_2(M_1)+1, \ldots, 2\log_2(M_1)+\log_2(M_2)$ in the second sub-group of transmission bits. It should be noted that the a priori probability may as well be neglected, i.e. $\log P_a(q(i))=0$. The value of these a posteriori log-likelihood ratio is given by $$L^{(2)}(\hat{u}_{k,l}) = \log \frac{p(u_{k,l} = +1 \mid \hat{y}_3)}{p(u_{k,l} = -1 \mid \hat{y}_3)} \tag{53}$$

$$= \log \frac{\sum_{\substack{q(i) \\ u_{k,l}(i)=+1}} e^{-\frac{1}{2\sigma_{\hat{y}_3}^2}|\log \hat{y}_3 - \log a^{q(i)}|^2 + \log(P_a(q(i)) + \frac{1}{2}u^{(2)}(i)^T L_a^{(2)}(u)}}{\sum_{\substack{q(i) \\ u_{k,l}(i)=-1}} e^{-\frac{1}{2\sigma_{\hat{y}_3}^2}|\log \hat{y}_3 - \log a^{q(i)}|^2 + \log(P_a(q(i)) + \frac{1}{2}u^{(2)}(i)^T L_a^{(2)}(u)}} \tag{54}$$

wherein further to the definition given above
- the sum in the nominator is taken over all possible length exponents q (i) associated with $u_{k,l}(i)=+1$;
- the sum in the denominator is taken over all length exponents q(i) associated with $u_{k,l}(i)=-1$;
- $P_a(u_{k,l}(i))$ are a priori probability log-likelihood ratios for the bits $u_{k,l}(i)$ in the second sub-group of transmission bits;
- $u^{(2)}(i)$ is a vector candidate for the second sub-group of transmission bits; and
- $L_a^{(2)}$ is a vector of a priori log-likelihoods corresponding to the second sub-group of transmission bits.

Further, the max-log approximation of (53) yields $$L(\hat{u}_{k,l}) \approx \tag{55}$$

$$\max_{\substack{q(i) \\ u_{k,l}(i)=+1}} -\frac{1}{2\sigma_{\hat{y}_3}^2}|\log \hat{y}_3 - \log a^{q(i)}|^2 + \log P_a(q(i)) + \frac{1}{2}u^{(2)}(i)^T L_a^{(2)}(u) -$$

$$\max_{\substack{q(i) \\ u_{k,l}(i)=-1}} -\frac{1}{2\sigma_{\hat{y}_3}^2}|\log \hat{y}_3 - \log a^{q(i)}|^2 + \log P_a(q(i)) + \frac{1}{2}u^{(2)}(i)^T L_a^{(2)}(u)$$

As outlined above, evaluation of log likelihood ratio values with respect to the first sub-group of transmission bits necessiates an approximation of channel parameters. The same also applies to the evaluation of log likelihood ratio values with respect to the second sub-group of transmission bits, in particular for a value of $\sigma_{\hat{y}_2}^2$. Heretofore, the second approximation unit 110 shown in FIG. 11 is adapted to derive an approximation according to:

$$\sigma_{\hat{y}_3}^2 = \frac{4\sigma^2(1+|\hat{y}_3|)}{\sqrt{|\hat{y}_3|(|\hat{y}_1|^2+|\hat{y}_2|^2)}} \tag{56}$$

The second approximation unit 110 operatively outputs this approximation to $\sigma_{\hat{y}_3}^2$ to the second max-log approximation unit 104 which is adapted to determine log likelihood ratios according to $$L^{(2)}(\hat{u}_{k,l}) \approx \max_{\substack{q(i) \\ u_{k,l}(i)=+1}} -\frac{\sigma^2}{2\sigma_{\hat{y}_3}^2}|\log \hat{y}_3 - \log a^{q(i)}|^2 + \tag{57}$$

$$\sigma^2 \log P_a(q(i)) + \frac{\sigma^2}{2}u^{(2)}(i)^T L_a^{(2)}(u) -$$

$$\max_{\substack{q(i) \\ u_{k,l}(i)=-1}} -\frac{\sigma^2}{2\sigma_{\hat{y}_3}^2}|\log \hat{y}_3 - \log a^{q(i)}|^2 +$$

$$\sigma^2 \log P_a(q(i)) + \frac{\sigma^2}{2}u^{(2)}(i)^T L_a^{(2)}(u)$$

$$\approx \max_{\substack{q(i) \\ u_{k,l}(i)=+1}} -\sqrt{\frac{|\hat{y}_3|(|\hat{y}_1|^2+|\hat{y}_2|^2)}{8(1+|\hat{y}_3|)}}|\log \hat{y}_3 - \log a^{q(i)}|^2 +$$

$$\sigma^2 \log P_a(q(i)) + \frac{\sigma^2}{2}u^{(2)}(i)^T L_a^{(2)}(u) - \max_{\substack{q(i) \\ u_{k,l}(i)=-1}} -$$

$$\sqrt{\frac{|\hat{y}_3|(|\hat{y}_1|^2+|\hat{y}_2|^2)}{8(1+|\hat{y}_3|)}}|\log \hat{y}_3 - \log a^{q(i)}|^2 +$$

$$\sigma^2 \log P_a(q(i)) + \frac{\sigma^2}{2}u^{(2)}(i)^T L_a^{(2)}(u)$$

for $l=2\log_2(M_1)+1, \ldots, 2\log_2(M_1)+\log_2(M_2)$, respectively.

It should be noted, that the log-likelihood values achieved through this representation and as calculated by the second max-log approximation unit 104 shown in FIG. 11 are scaled by a factor of $\sigma^2$ compared to actual log-likelihood values. As outlined above, this does not construe a problem as $\sigma^2$ is assumed to be constant during transmission of one frame.

The invention claimed is:
1. A method of achieving differential multiple-length transmit diversity from orthogonal designs using at least two transmit antennas, comprising the steps:
   dividing a group of transmission bits into a first sub-group of transmission bits and a second sub-group of transmission bits;
   mapping the first sub-group of transmission bits onto constellation points of a differential transmit diversity coding scheme from an orthogonal design for coding the first sub-group of transmission bits;
   determining transmission symbols through differential encoding of the constellation points and previously transmitted transmission symbols for setup of a transmission symbol vector; and
   scaling a length of the transmission symbol vector for coding the second sub-group of transmission bits;
   wherein the step of mapping the first sub-group of transmission bits comprises a step of:
      mapping the $2\cdot\log_2(M_1)$ transmission bits onto a constellation vector $[A_k B_k]$ of the differential transmit diversity coding scheme according to:

$$A_k = d_{2t+1}d(0)^* + d_{2t+2}d(0)^*$$

$$B_k = -d_{2t+1}d(0) + d_{2t+2}d(0)$$

wherein
      $d_i$ are constellation elements of a $M_1$-ary phase shift keying PSK modulation scheme;
      $d(0)$ is a freely selectable reference point of the $M_1$-ary phase shift keying PSK modulation scheme; and
      the length of the constellation vector is unit length $|A_k|^2+|B_k|^2=1$;
   the step of determining transmission symbols $(S_{2t+1} S_{2t+2})$ through differential encoding is achieved according to:

$$(S_{2t+1} S_{2t+2}) = A_k(X_{2t-1} X_{2t}) + B_k(-X^*_{2t} X^*_{2t-1}),$$

wherein
      t is an index in time; and
      $(X_{2t-1} X_{2t})$ is a transmission symbol vector according to a previously transmitted matrix; and
   the step of scaling the transmission symbol vector length is achieved according to:

$$(x_{2t+1} x_{2t+2}) = \sqrt[4]{a^{q_k}} \cdot (s_{2t+1} s_{2t+2})$$

wherein
      a is a constant; and
      $q_k \in \{-M_2+1, -M_2+2, \ldots, 0, 1, ., M_2-1\}$ is a length exponent.
2. A method according to claim 1, wherein the group of transmission bits comprises $2\cdot\log_2(M_1)+\log_2(M_2)$ bits,
   wherein
      $M_1$ is the number of possible bit sequences of the first sub-group of transmission bits;
      $M_2$ is the number of possible length values of the transmission symbol vector, and
   wherein
   the step of dividing the group of transmission bits comprises the steps:
      selecting a number of $2\cdot\log_2(M_1)$ bits in the group of transmission bits for the first sub-group of transmission bits; and
      selecting a number of $\log_2(M_2)$ bits in the group of transmission bits for the second sub-group of transmission bits; and
   the step of scaling a transmission symbol vector length is based on:
      calculating a set of $M_2$ scaling factors $\delta_k \in \{0, \ldots, M_2\}$ from a set of bit patterns $[p_1, \ldots, p_{log2}(M_2)]$ covering permutations of the second sub-group of transmission bits for all $p_i \in \{0, 1\}$ according to:

$$\delta_k = \sum_{i=1}^{i=\log_2(M_2)} [p_i \cdot 2^i];$$

and establishing a pre-determined relation between bit patterns of the second sub-group of transmission bits $[u_{k,2,1}, \ldots, u_{k,2,log2}(M_2)]$ and the set of scaling factors, wherein $u_{k,2,i}$ is the i-th bit in the second group of transmission bits.

3. The method according to claim 2, wherein the step of scaling comprises a step of calculating the length exponent according to:

mapping transmission bits of the second sub-group of transmission bits $[u_{k,2,1}, \ldots, u_{k,2,log2}(M_2)]$, to a scaling factor $\delta_k$ according to the pre-determined relation established between bit patterns of the second sub-group of transmission bits $[u_{k,2,1}, \ldots, u_{k,2log2}(M_2)]$ and the set of scaling factors; and calculating the next length exponent according to $$q_k = \delta_k - s(Q_{k-1} + \delta_k - M_2) - M_2;$$

wherein s( ) is a step function having a value of 1 for non-negative arguments and a value of 0 for negative arguments; and $Q_{k-1}$ length exponent representing the absolute length of the transmission symbol vector transmitted prior to calculation of the length exponent $q_k$.

4. A method of differential multiple-length diversity reception of transmission symbols using at least one reception antenna, wherein transmission symbols carry information being coded through mapping of a first sub-group of transmission bits onto constellation points of a differential transmit diversity scheme from an orthogonal design for coding the first sub-group of transmission bits, subsequent differential coding of the constellation points and previously transmitted transmission symbols for setup of a transmission symbol vector, and scaling of a length of the transmission symbol vector for coding a second sub-group of transmission bits, the method comprising the steps of:

organizing transmission symbols into a plurality of reception vectors according to a Pre-determined scheme;

combining the reception vectors for determination of at least a first decision variable and a second decision variable in relation to the first sub-group of transmission bits and further for determination of a third decision variable in relation to the second sub-group of transmission bits;

determining a first detection output in relation to the first sub-group of transmission bits on the basis of the first decision variable and the second decision variable, respectively; and determining a second detection output in relation to the second sub-group of transmission bits on the basis of the third decision variable; wherein organizing transmission symbols into a plurality of reception vectors is achieved according to:

$$y_k = \begin{bmatrix} y_{2t-1}^{(1)} \\ y_{2t}^{(1)*} \\ \vdots \\ y_{2t-1}^{(n_R)} \\ y_{2t}^{(n_R)*} \end{bmatrix}, \quad y_{k+1} = \begin{bmatrix} y_{2t+1}^{(1)} \\ y_{2t+2}^{(1)*} \\ \vdots \\ y_{2t+1}^{(n_R)} \\ y_{2t+2}^{(n_R)*} \end{bmatrix}, \quad \bar{y}_k = \begin{bmatrix} y_{2t}^{(1)} \\ -y_{2t-1}^{(1)*} \\ \vdots \\ y_{2t}^{(n_R)} \\ -y_{2t-1}^{(n_R)*} \end{bmatrix},$$

wherein t is a time index;

$n_R$ is the number of reception antennas;

* is a complex conjugate operator; and $y_i^{(j)}$ is a symbol received at time i at reception antenna j.

5. The method according to claim 4, wherein the step of combining the reception vectors for determination of a first decision variable $\hat{y}_1$, a second decision variable $\hat{y}_2$ and a third decision variable $\hat{y}_3$ is achieved according to:

$$\hat{y}_1 = y_k^H y_{k+1}; \quad \hat{y}_2 = \bar{y}_k^H y_{k+1}; \text{ and } \hat{y}_3 = \frac{y_{k+1}^H y_{k+1}}{y_k^H y_k};$$

wherein

H is operator of transposing a vector and applying the conjugate complex operator * to all vector elements.

6. The method according to claim 4, wherein the step of determining the first detection output in relation to the first sub-group of transmission bits is a hard output detection step; and the first detection output is determined as constellation vector [A(i)B(i)] from the differential transmit diversity scheme which is closest to a vector set up from the first decision variable and the second decision variable $[\hat{y}_1 \hat{y}_2]$ according to:

$$(\hat{A}_k \hat{B}_k) = \arg\min_i \{|\hat{y}_1 - A(i)|^2 + |\hat{y}_2 - B(i)|^2\}.$$

7. The method according to claim 6, further comprising a step of obtaining the first sub-group of transmission bits through demapping from $(\hat{A}_k \hat{B}_k)$.

8. The method according to claim 4, wherein the step of determining the second detection output in relation to the second sub-group of transmission bits is a hard output detection step; and the second detection output is determined by a length exponent $a^{q_k}$ which is closest to $\hat{y}_3$ according to:

$$\hat{a}^{q_k} = \arg\min |\hat{y}_3 - a^{q(i)}|, \quad q(i) \in \{-M_2+1, \ldots, -1, 0, 1, M_2-1\}$$

wherein $\{-M_2+1, \ldots, -1, 0, 1, M_2-1\}$ is a set of all candidate length exponents; and a is a constant.

9. The method according to claim 4, wherein the step of determining the first detection output in relation to the first sub-group of transmission bits is a soft output detection step; and log-likelihood ratios for the first sub-group of transmission bits are determined according to $$L^{(1)}(\hat{u}_{k,l}) = \log \frac{p(u_{k,l} = +1 \mid \hat{y}_1, \hat{y}_2)}{p(u_{k,l} = -1 \mid \hat{y}_1, \hat{y}_2)}$$

wherein k is a time index;

a vector of the first Sub-group of transmission bits $u_k$ of dimension $2\log_2(M_1)$ is mapped onto one of the $M_1^2$ constellation elements of the differential transmit diversity scheme and $u_{k,l}$ is a transmission bit at position l in $u_k$;

$\hat{y}_1$ is the first decision variable;

$\hat{Y}_2$ is the second decision variable;

$p(u_{k,l}=+1|\hat{y}_1, \hat{y}_2)$ is a conditional probability for $u_{k,l}=-1$ in view of determined decision variables $\hat{y}_l$ and $\hat{y}_2$;

$p(u_{k,l}=-1|\hat{y}_1, \hat{Y}_2)$ is a conditional probability for $u_{k,l}=-1$ in view of determined decision variables $\hat{y}_l$ and $\hat{y}_2$; and $L^{(1)}(u_{k,l})$ is the soft output for the first sub-group of transmission bits.

10. The Method according to claim 4, wherein the step of determining the second detection output in relation to the second sub-group of transmission bits is a soft output detection step; and log-likelihood ratios for the second sub-group of transmission bits are determined according to $$L^{(2)}(\hat{u}_{k,l}) = \log \frac{p(u_{k,l} = +1 \mid \hat{y}_3)}{p(u_{k,l} = -1 \mid \hat{y}_3)}$$

wherein k is a time index;

$u_{k,l}$ is a transmission bit at position l in a vector $u_k$ of dimension $\log_2(M_2)$, the vector $u_k$ being set up from the second sub-group of transmission bits;

$\hat{y}_3$ is the third decision variable;

$p(u_{k,l}=+1|\hat{y}_3)$ is a conditional probability for $u_{k,l}=+1$ in view of the decision variable $\hat{y}_3$;

$p(u_{k,l}=-1|\hat{y}_3)$ is a conditional probability for $u_{k,l}=-1$ in view of the decision variable $\hat{y}_3$; and $L^{(2)}(u_{k,l})$ is the soft output for the second sub-group of transmission bits.

11. An apparatus for achieving differential multiple-length transmit diversity using at least two transmit antennas, comprising:

a dividing unit adapted to divide a group of transmission bits into a first sub-group of transmission bits and a second sub-group of transmission bits;

a mapping unit adapted to map the first sub-group of transmission bits onto constellation points of a differential transmit diversity coding scheme for coding the first sub-group of transmission bits;

a coding unit adapted to determine transmission symbols through differential coding of the constellation points and previously transmitted transmission symbols for setup of a transmission symbol vector; and a scaling unit adapted to scale a length of the transmission symbol vector for coding the second sub-group of transmission bits; wherein the mapping unit is adapted to map the $2 \cdot \log_2(M_1)$ transmission bits onto a constellation vector $[A_k \; B_k]$ of the differential transmit diversity coding scheme according to:

$$A_k = d_{2t+1}d(0)^* + d_{2t+2}d(0)^*$$

$$B_k = d_{2t+1}d(0) + d_{2t+2}d(0)$$

wherein $d_i$ are constellation elements of a $M_1$-ary phase shift keying (PSK) modulation scheme;

$d(0)$ is a freely selectable reference point of the $M_1$-ary phase shift keying (PSK) modulation scheme; and the length of the constellation vector is unit length $|A_k|^2 + |B_k|^2 = 1$, the coding unit is adapted to achieve differential coding according to:

$$(s_{2t+1}s_{2t+2}) = A_k(x_{2t-1}x_{2t}) + B_k(-x_{2t}^* x_{2t-1}^*)$$

wherein t is an index in time; and $(x_{2t-1}x_{2t})$ is a transmission symbol vector of a previously transmitted matrix; and the scaling unit comprises a length modification unit, which is adapted to scale the transmission symbol vector length according to:

$$(x_{2t+1}x_{2t+2}) = \sqrt{a^{q_k}} \cdot s_{2t+1}s_{2t+2})$$

wherein a is a constant; and $q_k \in \{-M_2+1, -M_2+2, \ldots, 0, 1, \ldots, M_2-1\}$ is a length exponent.

12. The apparatus according to claim 11, wherein the sub-group of transmission bits comprises $2 \log_2(M_1) + \log_2(M_2)$ bits, wherein $M_1$ is the number of possible bit sequences of the first sub-group of transmission bits;

$M_2$ is the number of possible length values of the transmission symbol vector; and the dividing unit comprises:

a first selecting unit adapted to select a number of $2 \log_2(M_1)$ bits in the group of transmission bits for the first sub-group of transmission bits; and a second selecting unit adapted to select a number of $\log_2(M_2)$ bits in the group of transmission bits for the second sub-group of transmission bits; wherein the scaling unit comprises a length exponent memory unit adapted to store at least one length exponent as a function of a bit pattern of the second sub-group of transmission bits through:

calculating a set of $M_2$ scaling factors $\delta_k \in \{0, \ldots, M_2\}$ from a set of bit patterns $[p_1, \ldots, P_{log2(M_2)}]$ covering permutations of the second sub-group of transmission bits for all $p_i \in \{0, 1\}$ according to:

$$\delta_k = \sum_{i=1}^{i=\log_2(M_2)} [p_i \cdot 2^i];$$

and establishing a pre-determined relation between bit patterns of the second sub-group of input bits $[u_{k,2,l}, \ldots, u_{k,2,log_2(M_2)}]$ and the set of scaling factors, wherein $u_{k,2,i}$ is the i-th bit in the second sub-group of transmission bits corresponding-to the constellation vector $[A_k B_k]$.

13. The apparatus according to claim 12, characterized in that the scaling unit comprises a length exponent calculation unit adapted to calculate a length exponent through:

mapping transmission bits of the second sub-group of transmission bits $[u_{k,2,1}, \ldots, u_{k,2,log_2(M_2)}]$ to a scaling factor δk according to the pre-determined relation established between bit patterns of the second subgroup of transmission bits $[u_{k,2,1}, \ldots, u_{k,2,log_2(M_2)}]$ and the set of scaling factors; and calculating the next length exponent according to $$q_k = \delta_k - s(Q_{k-1} + \delta_k - M_2) \cdot M_2;$$

wherein
- s( ) is a step function having a value of 1 for non-negative arguments and a value of 0 for negative arguments; and
- $Q_{k-1}$ length exponent representing the absolute length of the transmission symbol vector transmitted prior to calculation of the length exponent $q_k$.

14. An apparatus for differential multiple-length diversity reception of transmission symbols using at least one reception antenna, wherein transmission symbols carry information being coded through mapping of a first sub-group of transmission bits onto constellation points of a differential transmit diversity scheme for coding the first group of transmission bits, subsequent differential coding of the constellation points and previously transmitted transmission symbols for setup of a transmission symbol vector, and scaling of a length of the transmission symbol vector for coding a second sub-group of transmission bits, the apparatus being characterized by:
- a vector building unit adapted to organize transmission symbols into a plurality of reception vectors according to a pre-determined scheme;
- a combining unit adapted to combine the reception vectors for determination of at least a first decision variable and a second decision variable in relation to the first sub-group of transmission bits and further for determination of a third decision variable in relation to the second sub-group of transmission bits;
- a first output detector adapted to determine a first detection output in relation to the first sub-group of transmission bits on the basis of the first decision variable and the second decision variable, respectively; and
- a second output detector adapted to determine a second detection output in relation to the second sub-group of transmission bits on the basis of the third decision variable;

wherein
the vector building unit is adapted to organize transmission symbols into a plurality of reception vectors according to:

$$y_k = \begin{bmatrix} y_{2t-1}^{(1)} \\ y_{2t}^{(1)=} \\ \vdots \\ y_{2t-1}^{(n_R)} \\ y_{2t}^{(n_R)=} \end{bmatrix},$$

$$y_{k+1} = \begin{bmatrix} y_{2t+1}^{(1)} \\ y_{2t+2}^{(1)=} \\ \vdots \\ y_{2t+1}^{(n_R)} \\ y_{2t+2}^{(n_R)=} \end{bmatrix},$$

$$\overline{y}_k = \begin{bmatrix} y_{2t}^{(1)} \\ -y_{2t-1}^{(1)=} \\ \vdots \\ y_{2t}^{(n_R)} \\ -y_{2t-1}^{(n_R)=} \end{bmatrix},$$

wherein
- t is a time index;
- $n_R$ is the number of reception antennas;
- * is a complex conjugate operator; and
- $y_i^{(j)}$ is a symbol received at time i at reception antenna j.

15. The apparatus according to claim 14, wherein the combining unit is adapted to combine the reception vectors for determination of a first decision variable $\hat{y}_1$, a second decision variable $\hat{y}_2$ and a third decision variable $\hat{y}_3$ according to:

$$\hat{y}_1 = y_k^H y_{k+1};$$

$$\hat{y}_2 = \overline{y}_k^H y_{k+1};$$

and $$\hat{y}_3 = \frac{y_{k+1}^H y_{k+1}}{y_k^H y_k};$$

wherein
H is operator of transposing a vector and applying the conjugate complex operator * to all vector elements.

16. The apparatus according to claim 14, wherein the first output detector is adapted to operate in a hard detection mode;
the first output detector comprises a constellation matching unit adapted to determine the first detection output as constellation vector [A(i)B(i)] from the differential transmit diversity scheme which is closest to a vector set up from the first decision variable and the second decision variable $[\hat{y}_1\ \hat{y}_2]$
according to:

$$(\hat{A}_k\hat{B}_k) = \arg\min_i\{|\hat{y}_1 - A(i)|^2 + |\hat{y}_2 - B(i)|^2\}.$$

17. The apparatus according to claim 16, further comprising a first bit demapping unit adapted to obtain the first sub-group of transmission bits through demapping from $(\hat{A}_k\ \hat{B}_k)$.

18. The apparatus according to claim 14, wherein the second output detector is adapted to operate in a hard detection mode; and
the second output detector comprises a scaling factor detection unit adapted to determine a length exponent $a^{qk}$ which is closest to the third decision variable $\hat{y}_3$ according to:

$$\hat{a}^{qk} = \arg\min_i |\hat{y}_3 - a^{q(i)}|, q(i) \in \{-M_2+1, \ldots, -1, 0, 1, M_2-1\}$$

wherein
- $\{-M_2+1, \ldots, -1, 0, 1, M_2-1\}$ is a set of all candidate length exponents; and
- a is a constant.

19. The method according to claim 14, wherein the first output detector is adapted to work in a soft detection mode; and
the first output detector comprises a first log likelihood calculation unit adapted to determine log-likelihood ratios for the first sub-group of transmission bits according to $$L^{(1)}(\hat{u}_{k,l}) = \log\frac{p(u_{k,l} = +1 | \hat{y}_1, \hat{y}_2)}{p(u_{k,l} = -1 | \hat{y}_1, \hat{y}_2)}$$

wherein k is a time index;

a vector of the first sub-group of transmission bits $u_k$ of dimension $2\log_2(M_1)$ is mapped onto one of the $M_1^2$ constellation elements of the differential transmit diversity scheme and $u_{k,l}$ is a transmission bit at position l in $u_k$;

$\hat{y}_1$ is the first decision variable;

$\hat{y}_2$ is the second decision variable;

$p(u_{k,l}=+1|\hat{Y}_1,\hat{y}_2)$ is a conditional probability for $u_{k,l}=+1$ in view of determined decision variables $\hat{y}_1$ and $\hat{y}_2$;

$p(u_{k,l}=-1|\hat{y}_1,\hat{y}_2)$ is a conditional probability for $u_{k,l}=-1$ in view of determined decision variables $\hat{y}_i$, and $\hat{y}_2$; and $L^{(1)}(u_{k,l})$ is the soft output for the first sub-group of transmission bits.

20. The apparatus according to claim 14, wherein the second output detector is adapted to operate in a soft detection mode; and the output detector comprises a second log likelihood ratio calculation unit adapted to determine log-likelihood ratios for the second sub-group of transmission bits according to $$L^{(2)}(\hat{u}_{k,l}) = \log \frac{p(u_{k,l}=+1|\hat{y}_3)}{p(u_{k,l}=-1|\hat{y}_3)}$$

wherein k is a time index;

$u_{k,l}$ is a transmission bit at position l in a vector $u_k$ of dimension $\log_2(M_2)$, the vector $u_k$ being set up from the second sub-group of transmission bits;

$\hat{y}_3$ is the third decision variable;

$p(u_{k,l}=+1|\hat{y}_3)$ is a conditional probability for $u_{k,l}=+1$ in view of the decision variable $\hat{y}_3$;

$p(u_{k,l}=-1|\hat{y}_3)$ is a conditional probability for $u_{k,l}=-1$ in view of the decision variable $\hat{y}_3$;

and $L^2(u_{k,l})$ is the soft output for the second sub-group of transmission bits.

21. A computer program stored on a computer readable storage medium wherein the program is directly loadable into an internal memory of a differential multiple length diversity transmitter comprising software code portions for performing the steps of claim 1, when the program is run on a processor of the differential multiple length diversity transmitter.

22. A computer program stored on a computer readable storage medium wherein the program is directly loadable into an internal memory of a differential multiple length diversity receiver comprising software code portions for performing the steps of claim 4, when the program is run on a processor of the differential multiple length diversity receiver.

* * * * *

UNITED STATES PATENT AND TRADEMARK OFFICE
CERTIFICATE OF CORRECTION

PATENT NO.      : 7,649,953 B2  Page 1 of 1
APPLICATION NO. : 10/545588
DATED           : January 19, 2010
INVENTOR(S)     : Gerhard Bauch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 922 days.

Signed and Sealed this

Twenty-third Day of November, 2010

David J. Kappos
*Director of the United States Patent and Trademark Office*